(12) United States Patent
Nagrath et al.

(10) Patent No.: US 8,504,948 B2
(45) Date of Patent: Aug. 6, 2013

(54) DESIGNING SYNTHETIC BIOLOGICAL CIRCUITS USING OPTIMALITY AND NONEQUILIBRIUM THERMODYNAMICS

(75) Inventors: Deepak Nagrath, Houston, TX (US); Marco Avila-Elchiver, Santiago (CL); Martin Yarmush, Newton, MA (US)

(73) Assignees: William Marsh Rice University, Houston, TX (US); The General Hospital Corporation, Boston, MA (US)

(*) Notice: Subject to any disclaimer, the term of this patent is extended or adjusted under 35 U.S.C. 154(b) by 0 days.

(21) Appl. No.: 13/250,043

(22) Filed: Sep. 30, 2011

(65) Prior Publication Data

US 2012/0117518 A1    May 10, 2012

Related U.S. Application Data

(60) Provisional application No. 61/388,436, filed on Sep. 30, 2010.

(51) Int. Cl.
*G06F 17/50* (2006.01)

(52) U.S. Cl.
USPC .......................................................... 716/30

(58) Field of Classification Search
USPC .......................................................... 716/30
See application file for complete search history.

(56) References Cited

U.S. PATENT DOCUMENTS

2003/0207833 A1* 11/2003 Berkley et al. ............... 514/44
2004/0204925 A1* 10/2004 Alon et al. ................... 703/2
2010/0211364 A1* 8/2010 Mandal et al. ............... 703/2

OTHER PUBLICATIONS

Alon U (2007) Network motifs: theory and experimental approaches. Nat Rev Genet 8: 450-461 (12 pages).
Chickarmane, V., et al., Transcriptional dynamics of the embryonic stem cell switch. PLoS Comput Biol, 2006. 2(9): p. e123. (13 pages).
Milo R, Itzkovitz S, Kashtan N, Levitt R, Shen-Orr S, et al. (2004) Superfamilies of evolved and designed networks. Science 303: 1538-1542 (6 pages).
Milo R, Shen-Orr S, Itzkovitz S, Kashtan N, Chklovskii D, et al. (2002) Network motifs: simple building blocks of complex networks. Science 298: 824-827 (5 pages).
Nagrath, D., et al., Metabolomics for mitochondrial and cancer studies. Biochim Biophys Acta, 2011. 1807(6): p. 650-63 (14 pages).
Balazsi G, Barabasi AL, Oltvai ZN (2005) Topological units of environmental signal processing in the transcriptional regulatory network of *Escherichia coli*. Proc Natl Acad Sci U S A 102: 7841-7846 (6 pages).

(Continued)

*Primary Examiner* — Vuthe Siek
*Assistant Examiner* — Mohammed Alam
(74) *Attorney, Agent, or Firm* — Osha Liang LLP

(57) ABSTRACT

In general, the invention relates to a method for designing a biological circuit. The method includes obtaining a target circuit objective for the biological circuit, determining an objective function corresponding to the target circuit objective, obtaining a number of nodes for the biological circuit, obtaining a set of possible circuit subgraphs using the number of nodes, obtaining a specific dissipation energy (SDE) for each one of the set of possible circuit subgraphs by optimizing the objective function, selecting at least one circuit subgraph from the set of possible circuit subgraphs with the lowest SDE, and designing the biological circuit using the at least one selected one circuit subgraph.

20 Claims, 26 Drawing Sheets

OTHER PUBLICATIONS

Nagrath, D., et al., Soft constraints-based multiobjective framework for flux balance analysis. Metab Eng, 2010. 12(5): p. 429-45 (17 pages).
Kalir S, Alon U (2004) Using a quantitative blueprint to reprogram the dynamics of the flagella gene network. Cell 117: 713-720 (8 pages).
Mangan S, Alon U (2003) Structure and function of the feed-forward loop network motif. Proc Natl Acad Sci U S A 100: 11980-11985 (6 pages).
Nagrath, D., et al., Metabolic preconditioning of donor organs: defatting fatty livers by normothermic perfusion ex vivo. Metab Eng, 2009. 11(4-5): p. 274-83 (10 pages).
Vazquez A, Dobrin R, Sergi D, Eckmann JP, Oltvai ZN, Barabasi AL (2004) The topological relationship between the large-scale attributes and local interaction patterns of complex networks. Proc Natl Acad Sci U S A 101: 17940-17945 (6 pages).
Nagrath, D., et al., Integrated energy and flux balance based multiobjective framework for large-scale metabolic networks. Ann Biomed Eng, 2007. 35(6): p. 863-85 (23 pages).
Prill RJ, Iglesias PA, Levchenko A (2005) Dynamic properties of network motifs contribute to biological network organization. PLoS Biol 3: e343 (12 pages).
Nagrath, D. et al., A hybrid model framework for the optimization of preparative chromatographic processes. . Biotechnol Prog, 2004. 20(1): p. 162-78 (17 pages).
Vilar JM, Rubi JM (2001) Thermodynamics "beyond" local equilibrium. Proc Natl Acad Sci U S A 98: 11081-11084 (4 pages).
Yang, Eric H. et al., Identification of Global Transcriptional Dynamics, PLoS ONE, vol. 4, Issue 7 Jul. 2009 (14 pages).
Jiang, J. et al., A core Klf circuitry regulates self-renewal of embryonic stem cells, Nature Cell Biology, vol. 10, No. 3, Mar. 2008 (31 pages).
Bustamante C, Liphardt J, Ritort F (2005) The nonequilibrium thermodynamics of small systems. Physics Today 58: 43-48 (6 pages).
Yang, E. et al., Transcription factor network reconstruction using the living cell array, Journal of Theoretical Biology 256, 2009, (15 pages).
Kim, J., et al., An extended transcriptional network for pluripotency of embryonic stem cells. Cell, 2008. 132(6): p. 1049-61 (13 pages).
Moxley, J. et al., Linking high-resolution metabolic flux phenotypes and transcriptional regulation in yeast modulated by global regulator Gcn4p, PNAS, vol. 106, No. 16, Apr. 21, 2009 (6 pages).
Qian H, Beard DA (2005) Thermodynamics of stoichiometric biochemical networks in living systems far from equilibrium. Biophys Chem 114: 213-220 (8 pages).
Chickarmane, V. and C. Peterson, A computational model for understanding stem cell, trophectoderm and endoderm lineage determination. PLoS ONE, 2008. 3(10): p. e3478 (8 pages).
Liphardt J, Dumont S, Smith SB, Tinoco I, Jr., Bustamante C (2002) Equilibrium information from nonequilibrium measurements in an experimental test of Jarzynski's equality. Science 296: 1832-1835 (4 pages).
Stephanopoulos, H. et al., Exploiting biological complexity for strain improvement through systems biology, Nature Biotechnology, vol. 22, No. 10, Oct. 2004 (7 pages).
Pan, G. and J.A. Thomson, Nanog and transcriptional networks in embryonic stem cell pluripotency. Cell Res, 2007. 17(1): p. 42-9 (8 pages).
Chan, C. et al., Application of Multivariate Analysis to Optimize Function of Cultured Hepatocytes, Biotechnol. Prog. 2003, 19, 580-598 (19 pages).
Oster G, Perelson A, Katchals.A (1971) Network Thermodynamics. Nature 234: 393-399 (7 pages).
Pan, G., et al., A negative feedback loop of transcription factors that controls stem cell pluripotency and self-renewal. FASEB J, 2006. 20(10): p. 1730-2 (12 pages).
Chan, C. et al., Metabolic Flux Analysis of Cultured Hepatocytes Exposed to Plasma. Biotechnology and . Bioengineering. vol. 81, No. 1 Jan. 5, 2003 p. 33-49 (17 pages).

Rothschild KJ, Ellias SA, Essig A, Stanley HE (1980) Nonequilibrium linear behavior of biological systems. Existence of enzyme-mediated multidimensional inflection points. Biophys J 30: 209-230 (22 pages).
Ben-Shushan, E., et al., Rex-1, a gene encoding a transcription factor expressed in the early embryo, is regulated via Oct-3/4 and Oct-6 binding to an octamer site and a novel protein, Rox-1, binding to an adjacent site. Mol Cell Biol, 1998. 18(4): p. 1866-78 (14 pages).
Burgard, A. et al., OptKnock: A Bilevel Programming Framework for Identifying Gene Knockout Strategies for Microbial Strain Optimization, Wiley Periodicals, Inc., Oct. 2003, (11 pages).
Qian H (2004) Motor protein with nonequilibrium potential: Its thermodynamics and efficiency. Phys Rev E Stat Nonlin Soft Matter Phys 69: 012901 (4 pages).
Shi, W., et al., Regulation of the pluripotency marker Rex-1 by Nanog and Sox2. J Biol Chem, 2006. 281(33): p. 23319-25 (7 pages).
Burgard, A. et al., Optimization-Based Framework for Inferring and Testing Hypothesized Metabolic Objective Functions, Wiley Periodicals, Inc., Jun. 2002 (8 pages).
Chernyak V, Chertkov M, Jarzynski C (2005) Dynamical generalization of nonequilibrium work relation. Phys Rev E Stat Nonlin Soft Matter Phys 71: 025102 (4 pages).
Sun, C., et al. Stem cell-specific expression of Dax1 is conferred by STAT3 and Oct3/4 in embryonic stem cells. Biochem Biochem Biophys Res Commun, 2008. 372(1): p. 91-6 (6 pages).
Ludovisi A, Pandolfi P, Illuminata Taticchi M (2005) The strategy of ecosystem development: specific dissipation as an indicator of ecosystem maturity. J Theor Biol 235: 33-43 (11 pages).
Ronen M, Rosenberg R, Shraiman BI, Alon U (2002) Assigning numbers to the arrows: parameterizing a gene regulation network by using accurate expression kinetics. Proc Nati Acad Sci U S A 99: 10555-10560 (6 pages).
Wong, W. et al., Single-cell zeroth-order protein degradation enhances the robustness of synthetic oscillator, EMBO and Nature Publishing Group 2007 (8 pages).
Lapidus S, Han B, Wang J (2008) Intrinsic noise, dissipation cost, and robustness of cellular networks: the underlying energy landscape of MAPK signal transduction. Proc Natl Acad Sci U S A 105: 6039-6044 (6 pages).
Shea MA, Ackers GK (1985) The OR control system of bacteriophage lambda. A physicalchemical model for gene regulation. J Mol Biol 181: 211-230 (20 pages).
Jana NK, Deb S, Bhattacharyya B, Mandal NC, Roy S (2000) A study of energetics of cooperative interaction using a mutant lambda-repressor. Protein Eng 13: 629-633 (5 pages).
Varedi, S. et al., Multisite Phosphorylation Provides an Effective and Flexible Mechanism for Switch-Like Protein Degradation, PLoS ONE, vol. 5, Issue 12, Dec. 2010 (18 pages).
Walton SP, Stephanopoulos GN, Yarmush ML, Roth CM (2002) Thermodynamic and kinetic characterization of antisense oligodeoxynucleotide binding to a structured mRNA. Biophys J 82: 366-377 (12 pages).
Dash, R. et al., Metabolic Dynamics in Skeletal Muscle during Acute Reduction in Blood Flow and Oxygen Supply to Mitochondria: In-Silico Studies Using a Multi-Scale, Top-Down Integrated Model, PLoS ONE, vol. 3, Issue 9, Sep. 2008 (21 pages).
Xia T, Frankel A, Takahashi TT, Ren J, Roberts RW (2003) Context and conformation dictate function of a transcription antitermination switch. Nat Struct Biol 10: 812-819 (8 pages).
Russo I, Barboro P, Alberti I, Parodi S, Balbi C, et al. (1995) Role of H1 in chromatin folding. A thermodynamic study of chromatin reconstitution by differential scanning calorimetry. Biochemistry 34: 301-311 (11 pages).
Zhou, H. et al., Multi-Scale Model of O2 Transport and Metabolism, Ann. N. Y. Acad. Sci. 1123; 178-186, 2008 (9 pages).
Dasika, M. et al., A computational Framework for the Topological Analysis and Targeted Disruption of Signal Transduction Networks, Biophysical Journal, vol. 91 Jul. 2006 (17 pages).
Dzeja PP, Terzic A (2003) Phosphotransfer networks and cellular energetics. J Exp Biol 206: 2039-2047 (9 pages).
Buchler NE, Gerland U, Hwa T (2003) On schemes of combinatorial transcription logic. Proc Natl Acad Sci U S A 100: 5136-5141 (6 pages).

Fong, S. et al., In Silico Design and Adaptive Evolution of *Escherichia coli* for Production of Lactic Acid, Wiley Periodicals, Inc., 2005 (6 pages).

Kitano, H. et al., Towards a theory of biological robustness, Mol Syst Biol 3: 137, 2007 (7 pages).

Dekel E, Alon U (2005) Optimality and evolutionary tuning of the expression level of a protein. Nature 436: 588-592 (5 pages).

Savageau MA, Freter RR (1979) Energy cost of proofreading to increase fidelity of transfer ribonucleic acid aminoacylation. Biochemistry 18: 3486-3493 (8 pages).

Ibarra RU, Edwards JS, Palsson BO (2002) *Escherichia coli* K-12 undergoes adaptive evolution to achieve in silico predicted optimal growth. Nature 420: 186-189 (4 pages).

Kashtan N, Itzkovitz S, Milo R, Alon U (2004) Topological generalizations of network motifs. Phys Rev E Stat Nonlin Soft Matter Phys 70: 031909 (12 pages).

Ma HW, Kumar B, Ditges U, Gunzer F, Buer J, et al. (2004) An extended transcriptional regulatory network of *Escherichia coli* and analysis of its hierarchical structure and network motifs. Nucleic Acids Res 32: 6643-6649 (7 pages).

Mangan S, Itzkovitz S, Zaslaver A, Alon U (2006) The incoherent feed-forward loop accelerates the response-time of the gal system of *Escherichia coli*. J Mol Biol 356: 1073-1081 (9 pages).

Mangan S, Zaslaver A, Alon U (2003) The coherent feed-forward loop serves as a sign-sensitive delay element in transcription networks. J Mol Biol 334: 197-204 (8 pages).

Dekel E, Mangan S, Alon U (2005) Environmental selection of the feed-forward loop circuit in gene-regulation networks. Phys Biol 2: 81-88 (8 pages).

Kalisky T, Dekel E, Alon U (2007) Cost-benefit theory and optimal design of gene regulation functions. Phys Biol 4: 229-245 (18 pages).

Stelling J, Sauer U, Szallasi Z, Doyle FJ, 3rd, Doyle J (2004) Robustness of cellular functions. Cell 118: 675-685 (11 pages).

Stelling J, Gilles ED, Doyle FJ, 3rd (2004) Robustness properties of circadian clock architectures. Proc Natl Acad Sci U S A 101: 13210-13215 (6 pages).

Morohashi M, Winn AE, Borisuk MT, Bolouri H, Doyle J, et al. (2002) Robustness as a measure of plausibility in models of biochemical networks. J Theor Biol 216: 19-30 (13 pages).

Martin OC, Wagner A (2008) Multifunctionality and robustness trade-offs in model genetic circuits. Biophys J 94: 2927-2937 (11 pages).

Rao CV, Wolf DM, Arkin AP (2002) Control, exploitation and tolerance of intracellular noise. Nature 420: 231-237 (8 pages).

Shen-Orr SS, Milo R, Mangan S, Alon U (2002) Network motifs in the transcriptional regulation network of *Escherichia coli*. Nat Genet 31: 64-68 (5 pages).

Zaslaver A, Mayo A, Ronen M, Alon U (2006) Optimal gene partition into operons correlates with gene functional order. Physical biology 3: 183-189 (7 pages).

Zaslaver A, Mayo AE, Rosenberg R, Bashkin P, Sberro H, Tsalyuk M, Surette MG, Alon U (2004) Just-in-time transcription program in metabolic pathways. Nat Genet 36: 486-491 (6 pages).

Kremlin A. et al., A feed-forward loop gurarantees robust behavior in *Escherichia coli* carbohydrate uptake, Bioinformatics, vol. 24, No. 5, 2008 (7 pages).

Krishna, S. et al., Structure and function of negative feedback loops at the interface of genetic and metabolic networks, Nucleic Acids Research, vol. 34, No. 8, 2006 (8 pages).

Nagrath, D. et al., Multiobjective Optimization Strategies for Linear Gradient Chromatography, AIChE Journal, vol. 51, No. 2, Feb. 2005 (15 pages).

* cited by examiner

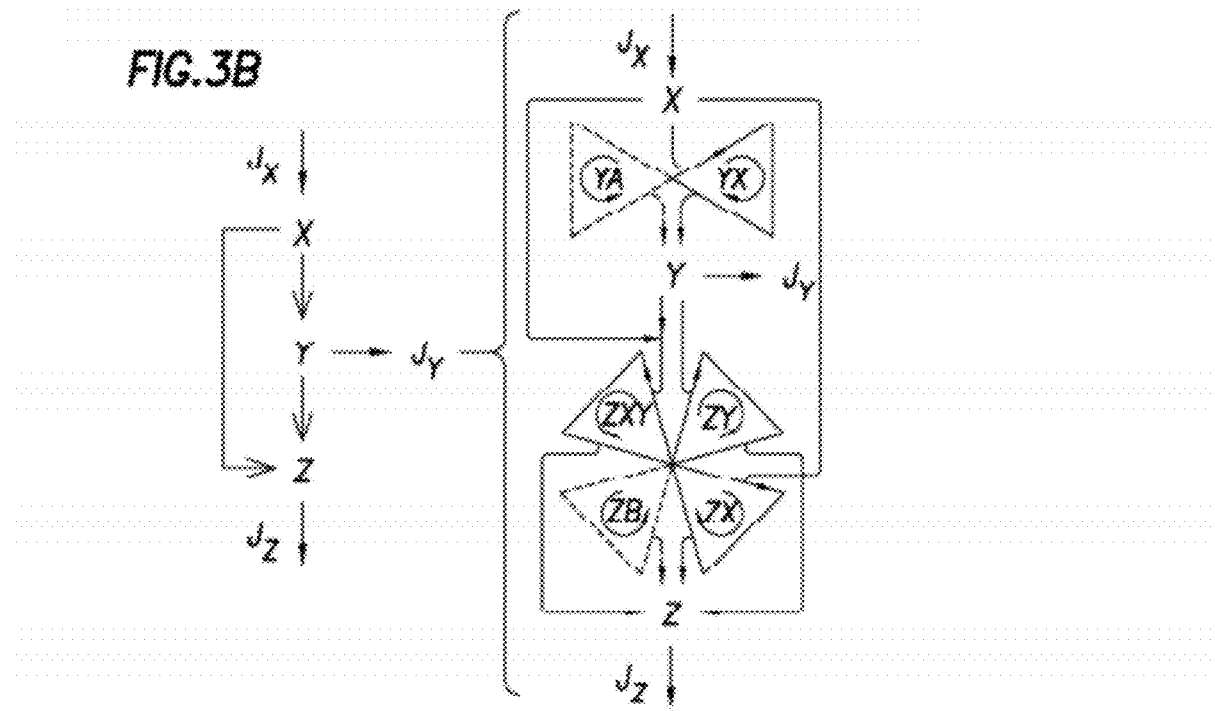

| | YA | $YX_1$ | $YX_2$ | $YX_1X_2$ | ZB | $ZX_1$ | $ZX_2$ | ZX | $ZX_1X_2$ | $ZX_1Y$ | $ZX_2Y$ | $ZX_1X_2Y$ |
|---|---|---|---|---|---|---|---|---|---|---|---|---|
| $k_1 [s^{-1} nM^{-1}]$ | 1 | 0.02 | 2 | $10^{-8}$ | 1 | 0.1 | 0.01 | 0.01 | $10^{-8}$ | $10^{-8}$ | $10^{-8}$ | $10^{-8}$ |
| $k_2 [s^{-1}]$ | 1 | 2 | 2 | $10^{-4}$ | 1 | 1 | 1 | 1 | $10^{-4}$ | $10^{-4}$ | $10^{-4}$ | $10^{-4}$ |
| $k_3 [s^{-1}]$ | | | | | | $10^{-3}$ | | | | | | |
| $k_{-1} [s^{-1}]$ | | | | | | $10^{-6}$ | | | | | | |
| $k_{-2} [s^{-1}]$ | | | | | | $10^{-6}$ | | | | | | |
| $k_{-3} [s^{-1} nM^{-2}]$ | | | | | | $10^{-6}$ | | | | | | |
| $\beta [nM \cdot s^{-1}]$ | 1 | 2 | 2 | $10^{-4}$ | 1 | 1 | 1 | 1 | $10^{-4}$ | $10^{-4}$ | $10^{-4}$ | $10^{-4}$ |
| $\kappa [nM]$ | 1 | 100 | 1 | $10^{4}$ | 1 | 10 | 100 | 100 | $10^{4}$ | $10^{4}$ | $10^{4}$ | $10^{4}$ |

| MOTIF | GENERALIZATION | MOTIF I.D. | Δ(SDE) [J/mol] |
|---|---|---|---|
| SIM | SIM(N,0) | SIM(2,0) | 0.0 |
| | | SIM(3,0) | 3.1 |
| | | SIM(4,0) | 4.6 |
| | | SIM(5,0) | 5.5 |
| | | SIM(6,0) | 6.2 |
| | SIM(N,1) | SIM(2,1) | 73906.9 |
| | | SIM(3,1) | 44111.9 |
| | | SIM(4,1) | 31443.5 |
| | | SIM(5,1) | 24429.8 |
| | | SIM(6,1) | 19975.3 |
| | SIM(N,2) | SIM(3,2) | 158315.8 |
| | | SIM(4,2) | 99867.9 |
| | | SIM(5,2) | 72964.6 |
| | | SIM(6,2) | 57487.7 |
| SINGLE INPUT MODULE | SIM(N,3) | SIM(3,3) | 10437448.6 |
| | | SIM(4,3) | 250715.1 |
| | | SIM(5,3) | 161717.0 |
| | | SIM(6,3) | 119412.4 |
| | SIM(N,4) | SIM(4,4) | 10446517.7 |
| | | SIM(5,4) | 348241.0 |
| | | SIM(6,4) | 226914.5 |
| | | SIM(7,4) | 168580.0 |
| FFL | FFL | FFL(1,1,1) | 0.0 |
| FEED FORWARD LOOP | 2X | FFL(2,1,1) | 9550.4 |
| | 2Y | FFL(1,2,1) | 30113.9 |
| | 2Z | FFL(1,1,2) | -28870.0 |

FIG. 11B

| MOTIF | GENERALIZATION | MOTIF I.D. | Δ(SDE) [J/mol] |
|---|---|---|---|
| DOR(2,2) <br> $X_1$ $X_2$ <br> $Y_1$ $Y_2$ <br><br> BIFAN | DOR(M,N) <br> $X_1$ $X_2$ ... $X_M$ <br> $Y_1$ $Y_2$ ... $Y_N$ <br><br> DENSE OVERLAPPING REGULONS (DOR) | DOR(2,2) | 0.0 |
| | | DOR(2,3) | 4.7 |
| | | DOR(2,4) | 7.1 |
| | | DOR(3,2) | 451.9 |
| | | DOR(3,3) | 458.2 |
| | | DOR(3,4) | 461.4 |
| | | DOR(4,2) | 864.6 |
| | | DOR(4,3) | 872.7 |
| | | DOR(4,4) | 876.7 |
| LAY(1,1,1) <br> X <br> ↓ <br> Y <br> ↓ <br> Z <br><br> 3-NODE SIMPLE REGULATION | LAY(M,N,P) <br> $X_1$ $X_2$ ... $X_M$ <br> $Y_1$ $Y_2$ ... $Y_N$ <br> $Z_1$ $Z_2$ ... $Z_N$ <br><br> LAYERED NETWORKS | LAY(1,1,1) | 0.0 |
| | | LAY(1,2,1) | −5,471.2 |
| | | LAY(1,3,1) | −41,141.4 |
| | | LAY(1,1,2) | 3,447.4 |
| | | LAY(1,2,2) | 1,747.4 |
| | | LAY(1,3,2) | 738.9 |
| | | LAY(1,1,3) | 5,459.4 |
| | | LAY(1,2,3) | 3,761.8 |
| | | LAY(1,3,3) | 2,762.3 |
| | | LAY(2,1,1) | −361.3 |
| | | LAY(2,2,1) | −29,127.9 |
| | | LAY(2,3,1) | −75,063.1 |
| | | LAY(2,1,2) | 3,094.7 |
| | | LAY(2,2,2) | 1,401.6 |
| | | LAY(2,3,2) | −2,324.0 |
| | | LAY(2,1,3) | 5,107.1 |
| | | LAY(2,2,3) | 3,419.9 |
| | | LAY(2,3,3) | 2,421.8 |
| | | LAY(3,1,1) | −211.5 |
| | | LAY(3,2,1) | −36,931.6 |
| | | LAY(3,3,1) | −84,881.4 |
| | | LAY(3,1,2) | 3,253.3 |
| | | LAY(3,2,2) | 1,567.1 |
| | | LAY(3,3,2) | −11,702.4 |
| | | LAY(3,1,3) | 5,266.0 |
| | | LAY(3,2,3) | 3,589.5 |
| | | LAY(3,3,3) | 2,592.5 |

| STEP | FUNCTIONS | FORMULATIONS |
|---|---|---|
| 1 | ANCHOR POINTS | OBTAIN THE ANCHOR POINTS, $g^{i*}$ FOR $i \in \{1, 2, ...n\}$, BY SOLVING PROBLEM Pi.k. DEFINE HYPERPLANE, AS THE ONE THAT COMPRISES THE ANCHOR POINTS. THIS PLANE IS CALLED THE UTOPIA HYPERPLANE (OR, UTOPIA PLANE). |
| 2 | OBJECTIVES MAPPING/ NORMALIZATION | COMPUTE THE NADIR POINTS AND UTOPIA POINTS. DEFINE L AS $L = [l_1, l_2, ... l_n]^T = g^N - g^U$ THAT LEADS TO THE NORMALIZED DESIGN METRICS AS $\bar{g}_i = \frac{g_i - g_i(x^U)}{l_i}$, $i = 1, 2, ... n$ |
| 3 | UTOPIA PLANE VECTOR | DEFINE THE DIRECTION, $\bar{N}_k$ FROM $\bar{g}^{k*}$ TO $\bar{g}^{n*}$ FOR $k \in \{1, 2, ...n\}$ AS $\bar{N}_k = \bar{g}^{n*} - \bar{g}^{k*}$ |
| 4 | NORMALIZED INCREMENTS | COMPUTE A NORMALIZED INCREMENT, $\delta_k$ ALONG THE DIRECTION $\bar{N}_k$ FOR A PRESCRIBED NUMBER OF SOLUTIONS, $m_k$, ALONG THE ASSOCIATED $\bar{N}_k$ DIRECTION: $$\delta_k = \frac{1}{m_k - 1} \quad (1 \le k \le n-1)$$ |
| 5 | GENERATE UTOPIA HYPERPLANE POINTS | EVALUATE A SET OF EVENLY DISTRIBUTED POINTS ON THE UTOPIA HYPERPLANE AS $$\bar{x}_{pj} = \sum_{k=1}^{n} \alpha_{kj} \bar{g}^{k*}$$ WHERE $0 \ge \alpha_{kj} \le 1$ AND $\sum_{k=1}^{n} \alpha_{kj} = 1$. |
| 6 | PARETO POINTS GENERATION | A SET OF WELL-DISTRIBUTED PARETO SOLUTIONS IN THE NORMALIZED OBJECTIVE SPACE. FOR EACH VALUE OF $\bar{x}_{pj}$ GENERATED IN STEP 5, THE CORRESPONDING PARETO SOLUTION IS OBTAINED BY SOLVING THE FOLLOWING PROBLEM: PROBLEM Pn $$\min_x \{\bar{g}_n(x)\}$$ SUBJECT TO: $f_j(x) \le 0 \quad (1 \le j \le r)$ |
| 7 | PARETO DESIGN METRICS VALUES | THE DESIGN METRICS VALUES FOR THE PARETO SOLUTIONS OBTAINED IN STEP 6 CAN BE OBTAINED USING THE EQUATION $g_i = \bar{g}_i l_i + g_i(x^U)$, $i = 1, 2, ... n$ |

*FIG.17*

DESIGNING SYNTHETIC BIOLOGICAL CIRCUITS USING OPTIMALITY AND NONEQUILIBRIUM THERMODYNAMICS

CROSS-REFERENCE TO RELATED APPLICATIONS

This application claims priority under 35 U.S.C. §119(e) to U.S. Provisional Patent Application Ser. No. 61/388,436, filed on Sep. 30, 2010, which is herein incorporated by reference.

BACKGROUND

Nearly 40 years after the initial prediction in 1964 by Monod and Jacob that cellular processes such as differentiation and protein regulation originate at the level of the gene, the field of synthetic and computational biology has emerged. Early work in the 1970's led to the realization that the complex networks contained in many biological systems would be impossible to model or even describe accurately without the use of advanced mathematics. The 1980's produced an explosion in readily available computing power along with the development of new mathematical techniques, such as non-linear dynamics and network analysis. In addition, toward the end of the last century, groundbreaking results from the fields of biotechnology and genetics gave the scientist the unprecedented ability to synthetically engineer simple biological systems.

The field of biological circuits combines all the above advances in mathematics, genetics, and biotechnology. This field draws heavily on the engineering principles of modularity, standardization, and predictive modeling to produce synthetic biological circuits and to also provide insight into naturally occurring complex biological networks. To date, simple synthetic biological circuit elements such as switches, oscillators and logic gates have been modeled theoretically and studied in the lab.

More complicated multi-element circuits and strongly interacting regulatory networks remain a challenge both computationally and experimentally, and much research is focused on both understanding the complex networks found in naturally occurring cellular systems (such as those found in stem cells) and in identifying the important characteristics and operating principles of such networks that might facilitate efficient design and construction of complex synthetic regulatory networks.

SUMMARY

In general, in one aspect, the invention relates to a method for designing a biological circuit, comprising obtaining a target circuit objective for the biological circuit, determining an objective function corresponding to the target circuit objective, obtaining a number of nodes for the biological circuit, obtaining a set of possible circuit subgraphs using the number of nodes, obtaining a specific dissipation energy (SDE) for each one of the set of possible circuit subgraphs by optimizing the objective function, selecting at least one circuit subgraph from the set of possible circuit subgraphs with the lowest SDE, and designing the biological circuit using the at least one selected one circuit subgraph.

In general, in one aspect, the invention relates to a computer readable medium comprising software instructions, which when executed by a process perform a method, the method comprising obtaining a target circuit objective for a biological circuit, determining an objective function corresponding to the target circuit objective, obtaining a number of nodes for the biological circuit, obtaining a set of possible circuit subgraphs using the number of nodes, obtaining a specific dissipation energy (SDE) for each one of the set of possible circuit subgraphs by optimizing the objective function, selecting at least one circuit subgraph from the set of possible circuit subgraphs with the lowest SDE, and designing the biological circuit using the at least one selected circuit subgraph.

In general, in one aspect, the invention relates to a method for designing a biological circuit, comprising obtaining a target circuit objective for the biological circuit, obtaining a set of possible circuit subgraphs based on the target circuit objective, obtaining a specific dissipation energy (SDE) for each one of the set of possible circuit subgraphs using a network model, selecting at least one circuit subgraph of the set of possible circuit subgraphs with the lowest SDE, and designing the biological circuit using the at least one selected circuit subgraph.

BRIEF DESCRIPTION OF DRAWINGS

FIGS. 3A-3C show examples in accordance with one or more embodiments.

FIGS. 8A-8C show examples in accordance with one or more embodiments.

FIGS. 11A-11B show examples in accordance with one or more embodiments.

FIG. 17 show an example in accordance with one or more embodiments.

DETAILED DESCRIPTION

Figure 1:
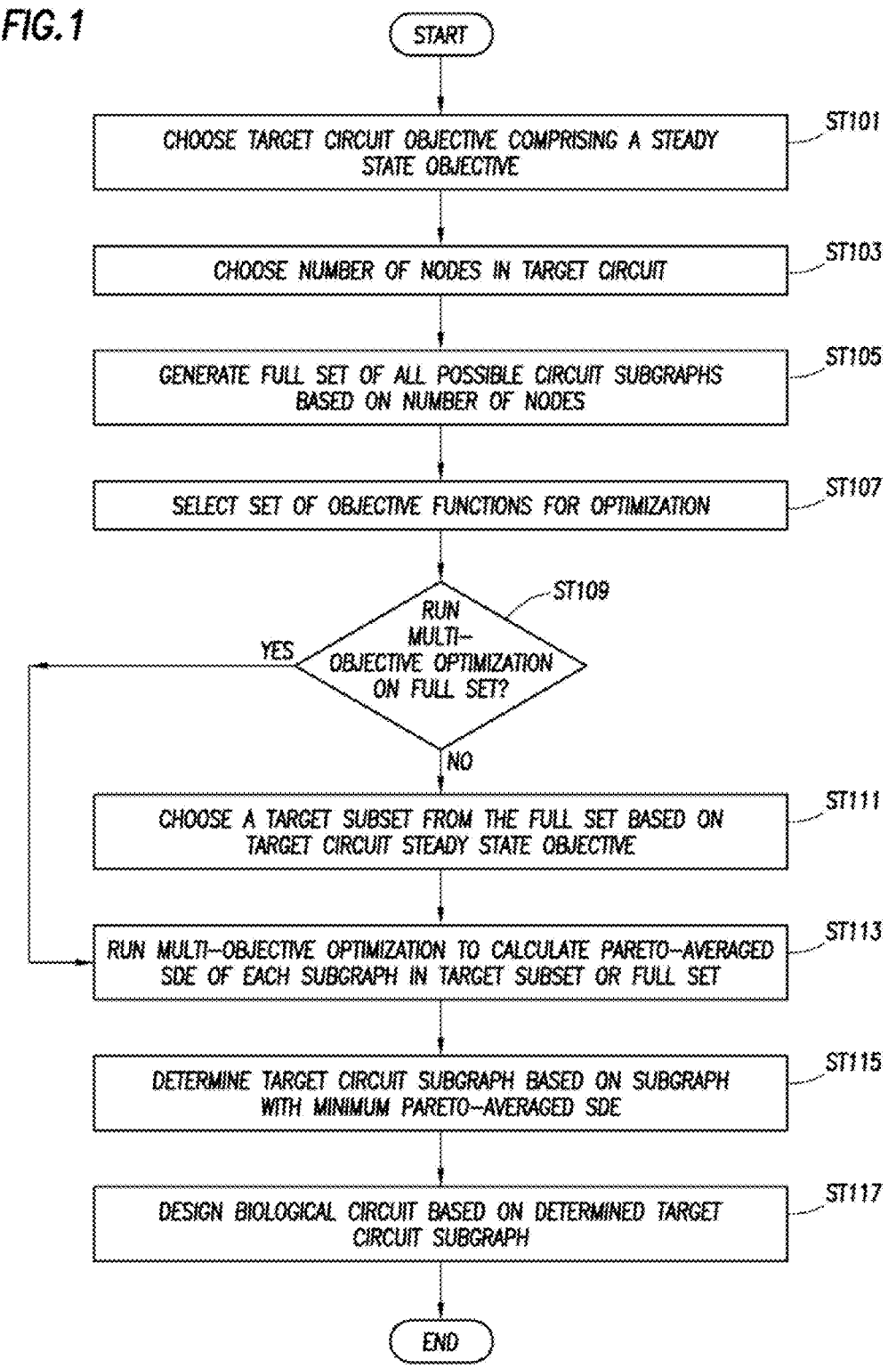
FIG. 1 shows a method in accordance with one or more embodiments.

Specific embodiments of designing synthetic biological circuits using optimality and nonequilibrium thermodynamics will now be described in detail with reference to the accompanying figures. Like elements in the various figures (also referred to as FIGs.) are denoted by like reference numerals for consistency.

In the following detailed description of embodiments, numerous specific details are set forth in order to provide a more thorough understanding of the method and system for designing synthetic biological circuits using optimality and nonequilibrium thermodynamics. However, it will be apparent to one of ordinary skill in the art that these embodiments may be practiced without these specific details. In other instances, well-known features have not been described in detail to avoid unnecessarily complicating the description.

In general, embodiments of the invention relate to a method and system for designing synthetic biological circuits using optimality and nonequilibrium thermodynamics. Further, embodiments may provide for the analysis of the energetic cost in the form of specific dissipation energy (SDE) of biological circuits designed to accomplish a particular objective. This analysis may be used, for example, to greatly reduce the initial parameter space involved when designing a biological circuit, thus, greatly enhancing a designer's ability to efficiently design complicated biological circuits.

In one or more embodiments of the invention, a biological circuit is a gene circuit, that includes one or more genes (e.g., operons) acting as the circuit nodes and biological molecules, such as proteins (e.g., transcription factors (TF)), mRNA, etc., serving as linkages (or information carriers) between nodes. The nodes and linkages of a gene circuit may be configured in many different ways. In other embodiments, a biological circuit is a metabolic network that includes one or more metabolites, acting as the circuit nodes, and biological molecules, such as enzymes serving as the linkages between nodes. A particular configuration of nodes and linkages constitutes a circuit subgraph. A biological circuit therefore may be composed of a single circuit subgraph or an interconnected combination of circuit subgraphs. The term biological circuits also may refer to, for example, gene networks or transcriptional regulatory networks (TRNs). A biological circuit may accomplish a specific function known as a target circuit objective.

While the examples described herein are directed to TRNs, one of ordinary skill will appreciate that many other types of biological circuits may be designed in accordance with one or more embodiments of the invention without departing from the scope of the present disclosure. Accordingly, as used herein, the term gene circuit may be understood to encompass these other known types of biological circuits or networks, e.g., biological networks found in stem cells and metabolic networks designed to perform an array of metabolic functions (protein secretion, detoxification, energy production, etc.).

Target circuit objectives may include steady state objectives. In one embodiment of the invention, steady state objectives are target circuit objectives that result in an output of the target circuit that is constant in time, i.e., a steady state output, e.g., a constant output flux of a biological molecule. Target circuit objectives may also include dynamic function objectives. Dynamic function objectives are target circuit objectives that result in a time-varying output, i.e., a dynamic output of the target circuit. Examples of dynamic function objectives may include, but are not limited to, oscillation and pulse generation.

In accordance with one or more embodiments of the invention, the energetic cost, termed specific dissipation energy (SDE) of a biological circuit is defined to be the ratio of the heat dissipation rate (HDR) to input mass flux (J) in a non-equilibrium steady state (NESS) system. (See equation (1) below).

$$SDE = \frac{HDR}{J} \quad (1)$$

As used herein, an NESS system is one that requires an external signal, flux, or driving force to maintain the system far from equilibrium, e.g., a TRN may require an input mass flux of transcription factor X in order drive the system to produce an output mass flux $J_Z$ of protein Z.

For a particular target circuit objective, an optimal biological circuit (implemented as either a circuit subgraph or combination of circuit subgraphs), referred to as a target circuit, may be indentified from a large set of potential target circuits through a determination that the identified biological circuit (relative to other potential target circuits in the larger set of potential target circuits) has a minimal energetic cost. The minimal energetic cost may correspond to a minimal SDE, a minimal Pareto-averaged SDE, or a minimal time-averaged SDE. As described in further detail below, for the case of TRNs having a single target circuit objective, SDE may be calculated directly using a cyclic kinetic TRN model. For target circuits that may have multiple target circuit objectives, a multi-objective optimization procedure may be used in conjunction with a cyclic kinetic TRN model to calculate Pareto-averaged SDEs or time-averaged SDEs.

Optimization of a biological circuit may include, for example, maximizing one or more objective functions while subjecting the system to a set of constraints. One of ordinary skill will appreciate that the set of constraints may vary depending on the type of circuit of network being analyzed. For example, sets of constraints described below for TRNs may be used. Furthermore, in accordance with one or more embodiments, sets of constraints for metabolic networks may be used, for examples, as described in Nagrath, et al., *Annals of Biomedical Engineering*, Vol. 35, No. 6, June 2007, pp. 863-885, incorporated herein by reference in its entirety. Objective functions are mathematical functions, or a set of mathematical functions, that quantify a target circuit objective. Objective functions may include, for example, functions that quantify a steady state output of a circuit or a dynamic output of a circuit (e.g., the production of a biological molecule such as a protein or transcription factor).

FIG. 1 shows a method in accordance with one or more embodiments of the invention. While the various steps in the flowchart are presented and described sequentially, one of ordinary skill will appreciate that some or all of the steps may be executed in different orders, may be combined, or omitted, and some or all of the steps may be executed in parallel.

Figure 3A:
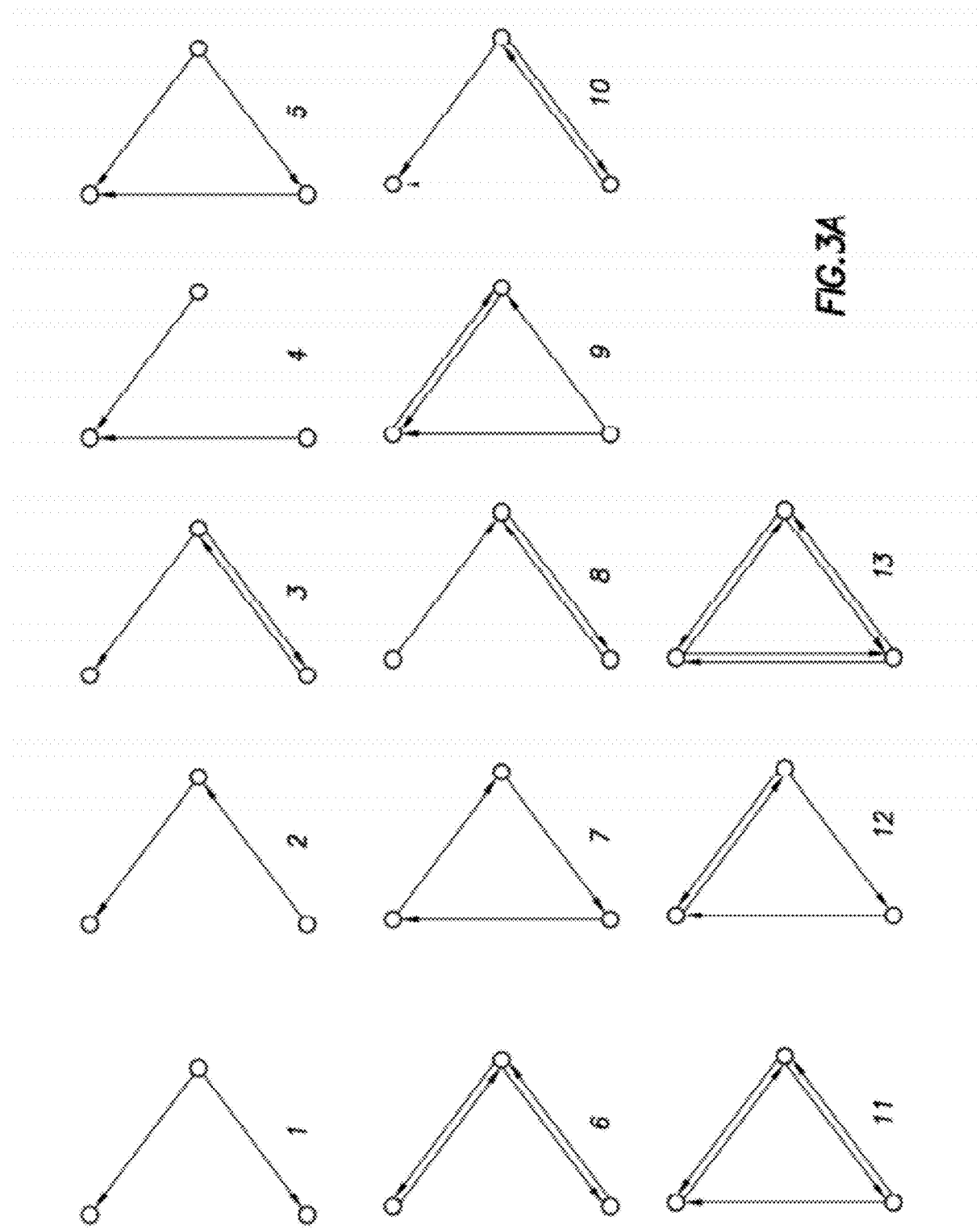

In ST101, a target circuit objective comprising a steady state objective is selected. In ST103, the number of nodes in the target circuit is selected. In ST105, a full set of all possible circuit subgraphs with the chosen number of nodes may be generated. For example, as shown in FIG. 3A, for the case of a three node subgraph, there exist 13 possible combinations of nodes and linkages in the full set. In ST107, a set of objective functions for optimization based on the target circuit objective is selected. For example, the user may select to maximize the output flux of one or more biological molecules such as proteins, mRNA, or transcription factors. For the case of a TRN, the target circuit objective may be to produce the steady state fluxes $J_y$ and $J_z$ of proteins Y and Z, respectively.

Accordingly, the objective functions used for the optimization are functions that quantify the fluxes $J_y$ and $J_z$. These functions may be obtained in a variety of ways, for example, from a cyclic kinetic TRN model.

In ST109, a determination is made about whether to execute a multi-objective optimization procedure using the full set of circuit subgraphs or execute a multi-objective optimization procedure using a subset of circuit subgraphs from the full set. If the multi-objective optimization procedure is executed using the subset, the full set is first reduced to a target subset in ST111 by eliminating circuit subgraphs that do not accomplish the target circuit objective. For example, if the target circuit objective is to produce the steady state fluxes $J_y$ and $J_z$, circuit subgraphs that cannot produce steady state fluxes $J_y$ and $J_z$ are removed from the full set to create the target subset. In ST113, the multi-objective optimization is executed to calculate the Pareto-averaged SDE for each circuit subgraph in the target subset or full set. In one embodiment of the invention, the multi-objective optimization is executed to optimize the objective functions specified in ST107 subject to a set of chosen constraints. (see FIG. 2 below). In accordance with one or more embodiments, the chosen constraints may take the mathematical form of a plurality of equality constraints and/or a plurality of inequality constraints. In ST115, the target circuit subgraph, or set of target circuit subgraphs, is determined by finding the subgraph, or set of subgraphs, with the minimum Pareto-averaged SDE. In step ST117, the target circuit subgraph, or set of target circuit subgraphs may then be designed and/or constructed or further used as fundamental subgraphs for the design and/or construction more complex synthetic biological circuits having optimal energetic cost, high overall robustness, etc.

Figure 2:
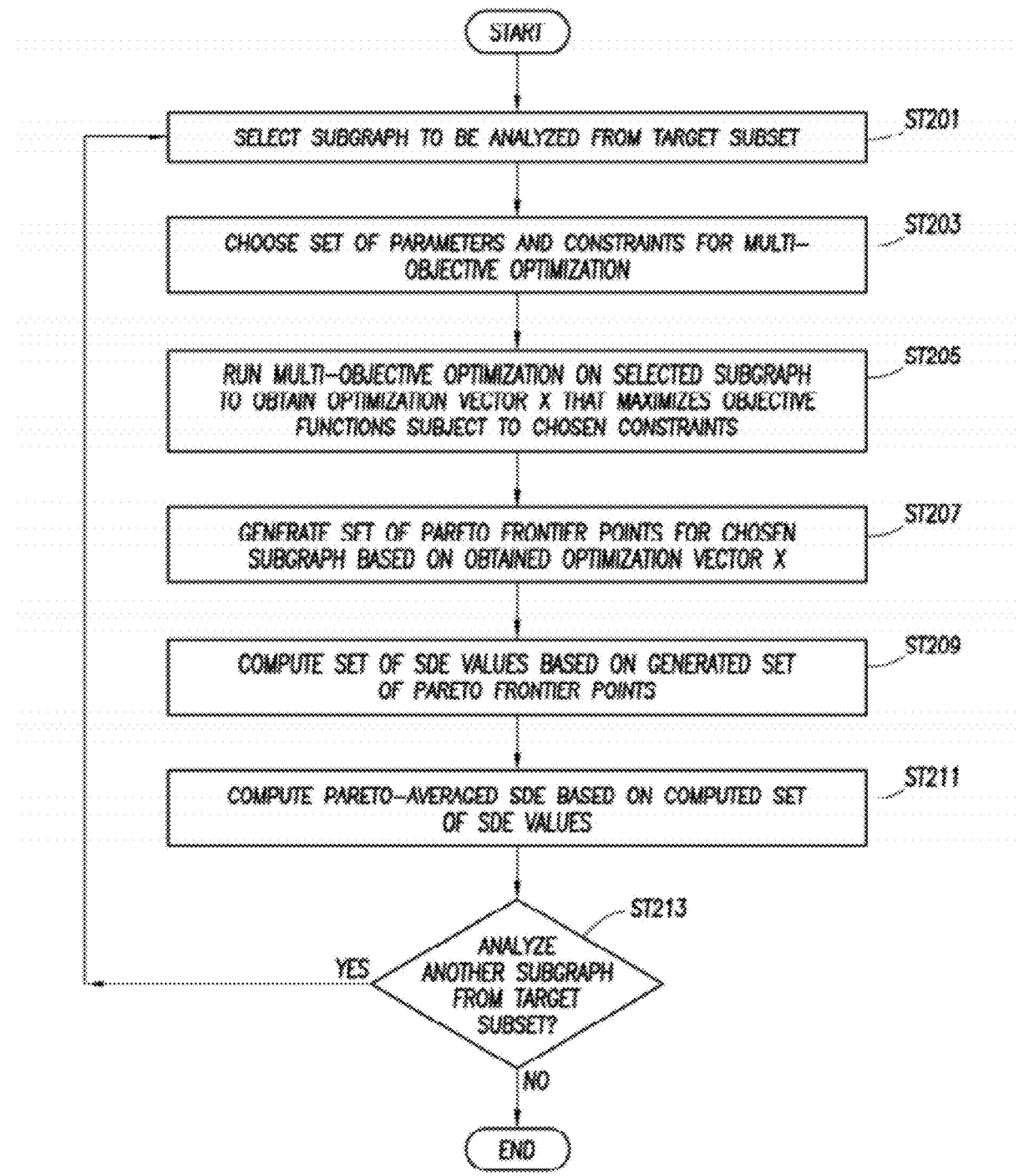
FIG. 2 shows a method in accordance with one or more embodiments.

FIG. 2 shows a method illustrating the steps involved in the multi-objective optimization procedure of Step 113 in accordance with one or more embodiments of the invention. In ST 201, a circuit subgraph is selected from the target subset. In ST 203, a set of parameters and constraints for the multi-objective optimization are chosen for the selected subgraph based on the target circuit objectives. FIG. 3B shows examples of the set of parameters and constraints used for a TRN circuit subgraph known as the type 1 coherent feed forward loop (coherent-FFL) that is designed to produce output fluxes $J_y$ and $J_z$. More generally, the constraints may be:

$$f(\vec{x}) = 0$$

$$HDR_{lb} \leq HDR \leq HDR_{ub}$$

$$\vec{x}_{lb} \leq \vec{x} \leq \vec{x}_{ub}$$

where the equality constraint f(x)=0 represents the nonlinear mass balance equations at steady state for the selected subgraph that are imposed by cyclic kinetic TRN modeling (described in more detail below with reference to the examples) and $\vec{x} = [[X], J_Y, J_Z]^T$.

In ST 205, the multi-objective optimization is executed using the selected subgraph to determine the set of optimization vectors $\vec{x}$ that maximize the chosen objective functions subject to the chosen constraints. For example, continuing with the coherent FFL example, the multi-objective optimization problem may be stated as follows:

$$\underset{\vec{x}}{\text{Maximize}} (J_Y, J_Z)$$

$$\text{subject to: } f(\vec{x}) = 0$$

$$HDR_{lb} \leq HDR \leq HDR_{ub}$$

$$\vec{x}_{lb} \leq \vec{x} \leq \vec{x}_{ub}$$

One of ordinary skill will appreciate that there are many known methods of solving the above multi-objective optimization problem.

In accordance with one or more embodiments of the invention, the multi-objective optimization problem is solved by way of a normalized constraints method. Details of one possible implementation of a normalized constraints (NC) method are outlined in FIGS. 16A-16B. The NC method is based on design space reductions using reduction constraints. The reduction constraint is constructed by ensuring the orthogonality between a normal w and $r_0$ an arbitrary point on a plane. The vector equation of a plane is expressed as $w \cdot (r-r_0)=0$. To solve for multi-objective solutions, a reduced feasible space is constructed using the previous equation as $w \cdot (r-g) \leq 0$ where g is any point in the feasible space.

In 16B(1), the non-normalized design space and the Pareto frontier of a bi-objective problem is shown. In FIG. 16B(3) the normalized Pareto frontier in the normalized design space is shown. In the normalized objective space, while the utopia point is at the origin, all anchor points are one unit away from the utopia point. A bar over a variable implies that it is normalized. The two anchor points denoted by $g_1^*$ and $g_2^*$, are obtained by successively minimizing the first and second design metrics. The line joining these two points is the utopia line. The actual optimization takes place in the normalized objective space. Let $\bar{g}$ be the normalized form of g and $g^u$, the utopia point is defined as $g^u = [g_1(x^{1*}) g_2(x^{2*})]^T$ where $l_1$ and $l_2$ be the distances between $\bar{g}^{2*}$ and $\bar{g}^{1*}$, and the Utopia point, $g^u$, respectively. Then $l_1 = g_1(x^{2*}) - g_1(x^{1*})$ and $l_2 = g_2(x^{1*}) - g_2(x^{2*})$. The normalized design objectives can then be evaluated as:

$$\bar{g}^T = \left[ \frac{g_1(x) - g_1(x^{1*})}{l_1} \quad \frac{g_2(x) - g_2(x^{2*})}{l_2} \right]$$

$\bar{N}_1$ is defined as the direction from $\bar{g}^{1*}$ to $\bar{g}^{2*}$, yielding $\bar{N}_1 = \bar{g}^{2*} - \bar{g}^{1*}$. Next, the utopia line is divided into $m_1 - 1$ segments, resulting in $m_1$ points. A normalized increment, $\delta_1$ along the direction $\bar{N}_1$ for a prescribed number of solutions, $m_1$, is obtained as:

$$\delta_1 = \frac{1}{m_1 - 1}$$

Figure 16C:
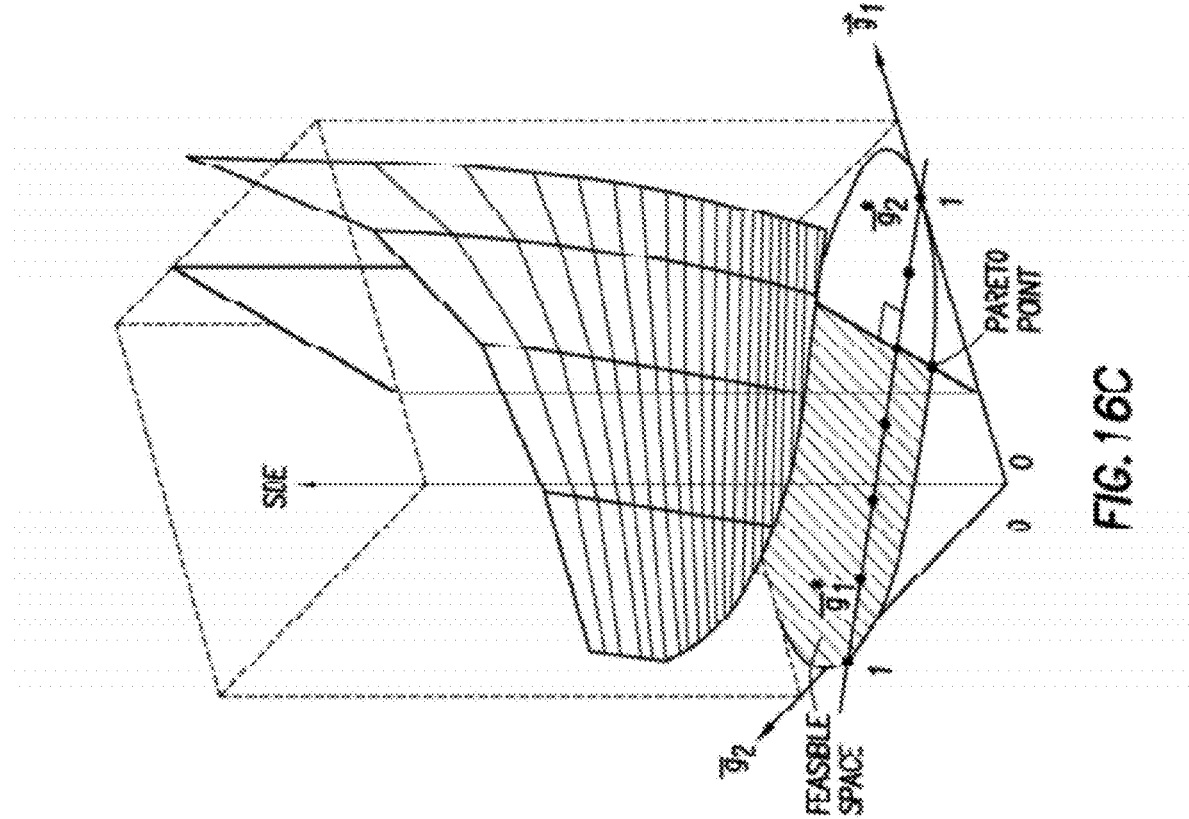
FIGS. 16A-16C show examples in accordance with one or more embodiments.
Figure 16A:
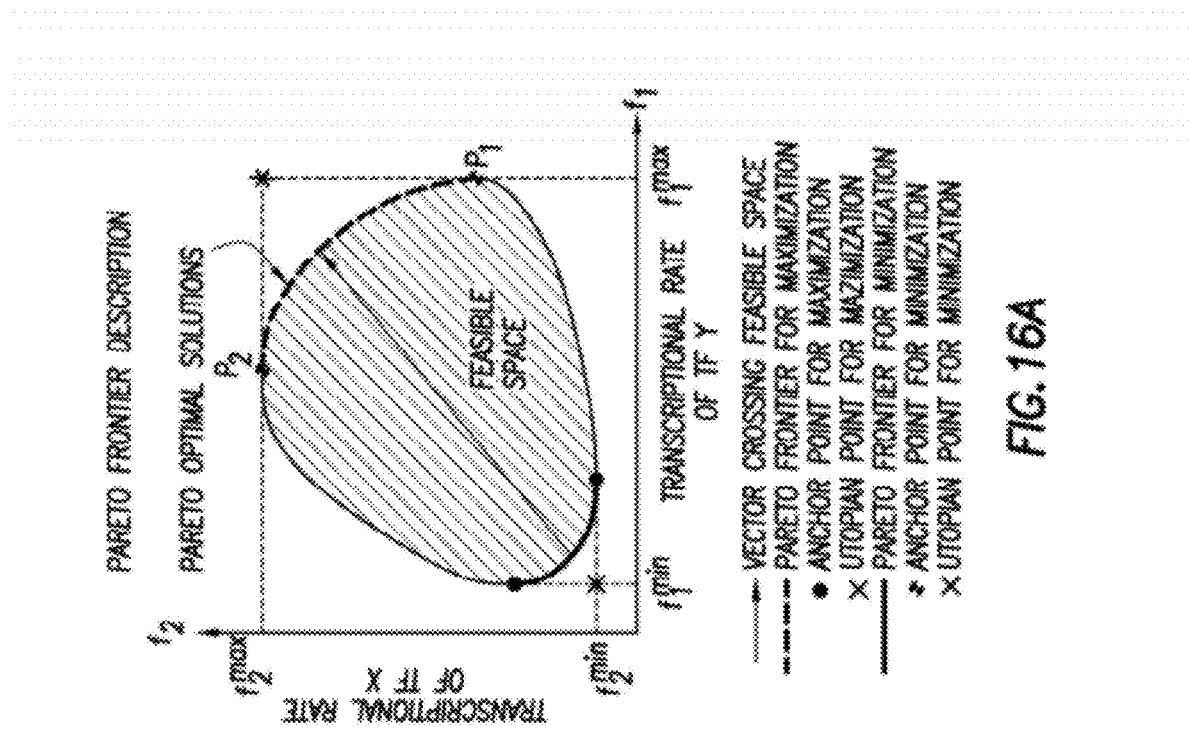
Figure 16B:
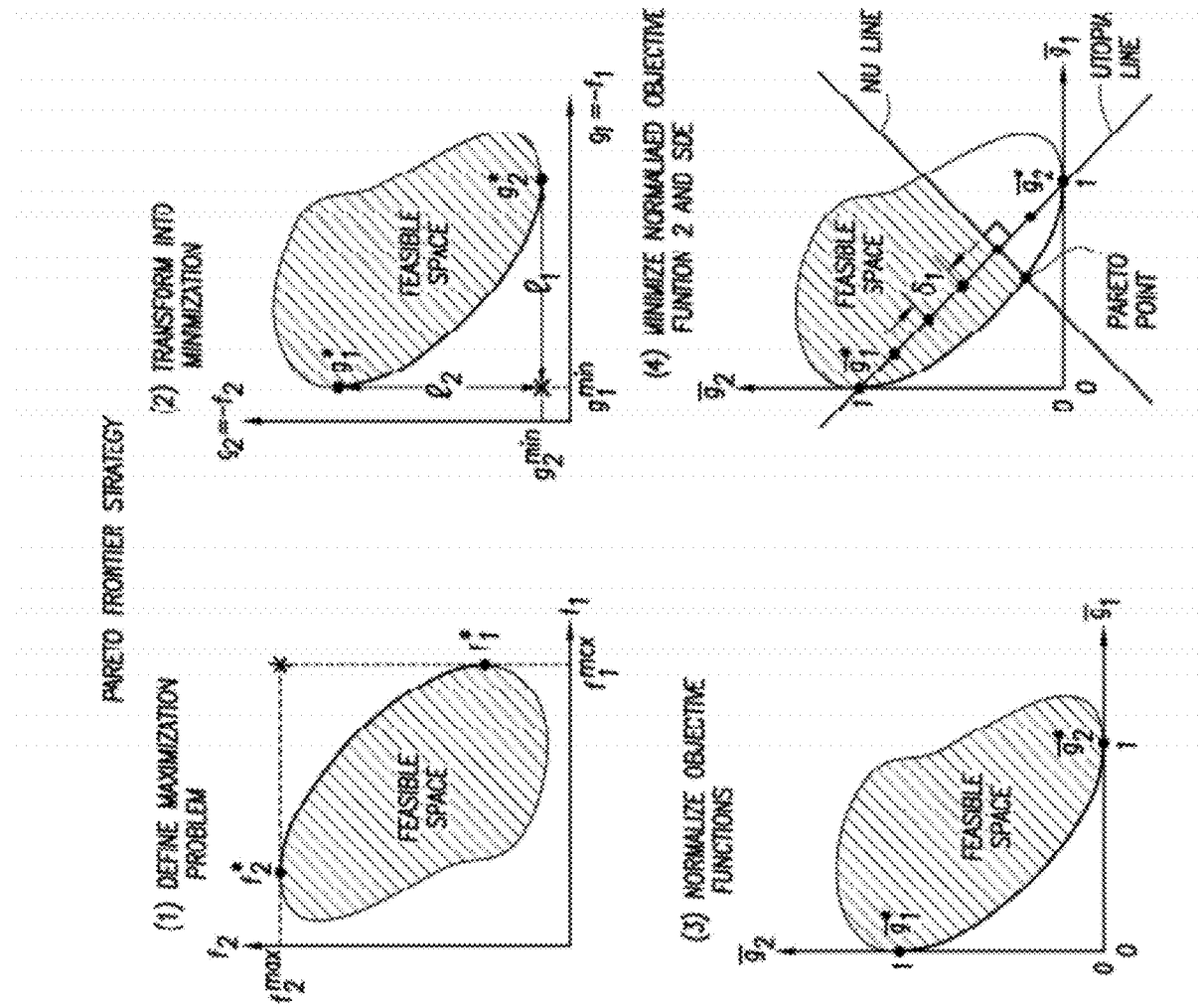

As seen in FIG. 16(4), the next step involves generating a set of evenly distributed points on the utopia line as $\bar{X}_{Pj} = \alpha_{1j} \bar{g}^{1*} + \alpha_{2j} \bar{g}^{2*}$ where $0 \leq \alpha_{1j} \leq 1$, $\alpha_{1j} + \alpha_{2j} = 1$, and $\alpha_{1j}$ is incremented by $\delta_1$ between 0 and 1, with values of j as $j \in \{1, 2, \ldots, m_1\}$.

FIG. 16(4) shows one of the generic points intersecting the segments used to define a normal to the utopia line. This normal line is used to reduce the feasible space as indicated in the figure. As observed in the figure, if $\bar{g}_2$ is minimized, the resulting optimum point is $\bar{g}^{2*}$. By translating the normal line, a corresponding set of solutions are generated. This is done by generating a corresponding set of Pareto points by solving a succession of optimization runs of Problem P2. Each optimization run corresponds to a point on the utopia line. For each generated point on the utopia line, solve for the jth point:

Problem P2 (for j-th point):

$$\min_{x} \{\bar{g}_2(x)\}$$

subject to:

$$h_k(x)=0, 1 \leq k \leq r$$

$$f_j(x)=0, 1 \leq j \leq s$$

$$x_l \leq x_i \leq x_u, 1 \leq i \leq n_x$$

$$\bar{N}_1(\bar{g}-\bar{X}_{Pj})^T \leq 0$$

This results in a set of vectors for the design parameters. Each Pareto point gives one vector x. Then, cellular objective functions are computed by evaluating the non-normalized design metrics that correspond to each Pareto point. The non-normalized design objectives can be obtained by using the relation $g=[\bar{g}_1 l_1+g_1(x^{1*})\bar{g}_2 l_2+g_2(x^{2*})]^T$.

Importantly, the generation of the set of Pareto points is performed in the normalized objective space, resulting in critically beneficial scaling properties. The steps involved and the essential mathematical formulation for the NC method are presented in the table shown in FIG. 17 for the n-objective case.

However, one of ordinary skill will appreciate that other methods may be used to solve the multi-objective optimization problem described above, e.g., the soft constraints method described within Nagrath et al., *Metab. Eng.* (2010), doi:10.1016/j.ymben.2010.05.003, incorporated herein by reference in its entirety, the physical programming method, etc.

Figure 3C:
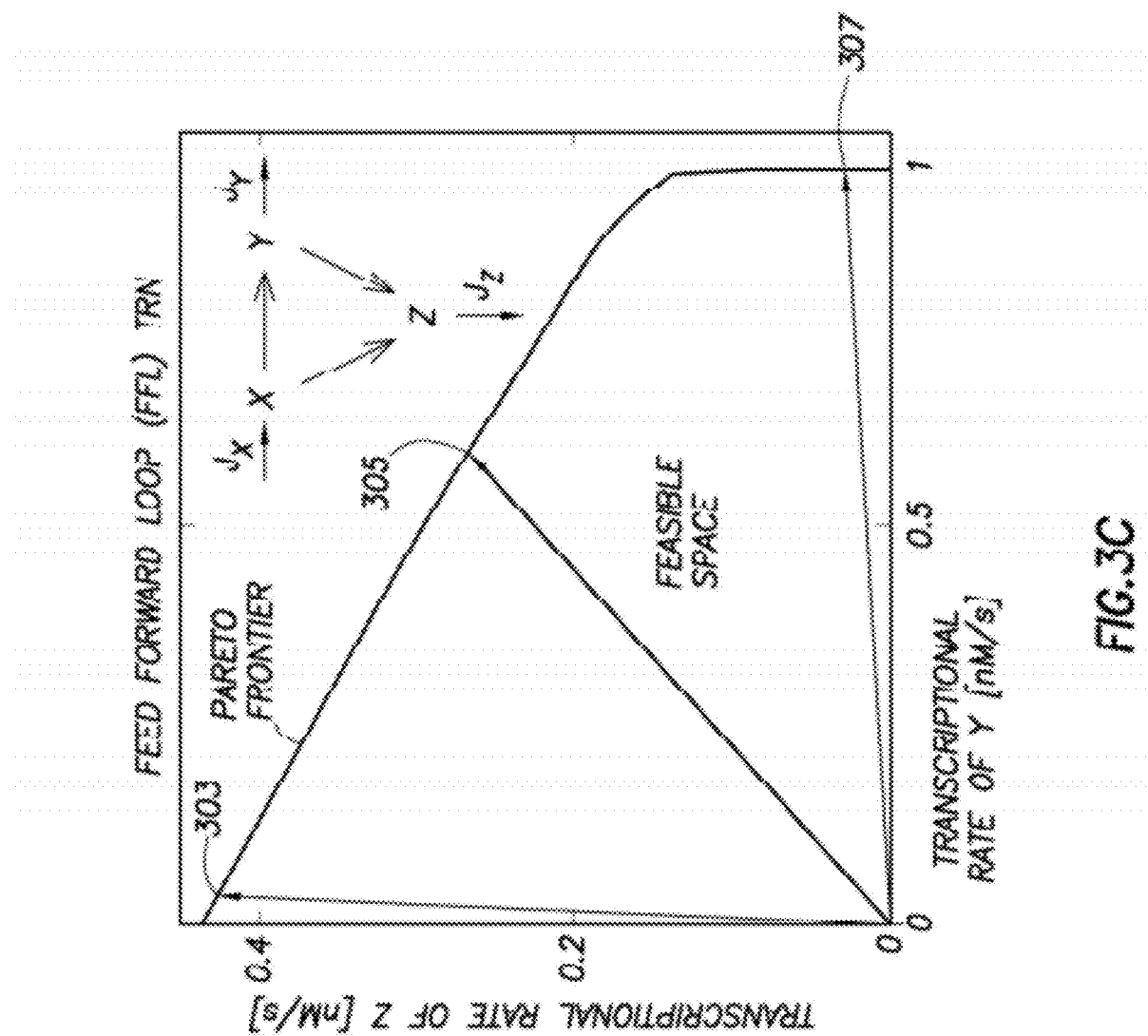

In ST 207, the set of Pareto frontier points are generated from the set of vectors obtained from the multi-objective optimization procedure. In accordance with one or more embodiments, each vector $\vec{x}$ corresponds to a point on the Pareto frontier. An example of a computed Pareto frontier for maximization 301, along with the relevant parameters and constraints for a cyclic kinetic model of a coherent type 1-FFL is shown in FIGS. 3B and 3C.

In ST 209, the SDE is calculated for each point (or for a subset of points) on the Pareto frontier. The SDE may be calculated using the results of the multi-objective optimization i.e., the set of vectors $\vec{x}$, in combination with the cyclic kinetic TRN model and Eq. 1. For example, the steps for calculating SDE for a general FFL are outlined below. First, the necessary global parameters are set. For example, in a cyclic TRN model the concentration of basal activator of Y, [A], the concentration of basal activator of Z, [B], the concentration of total available sites for transcription of Y, $[D_Y]_{tot}$, the concentration of total available sites for transcription of Z, $[D_Z]_{tot}$, the degradation rates for each species, $\alpha$, and the temperature, T are set. Next, for each of the 8 cycles forming the FFL motif YA, YX, ZB, ZX, ZY, ZXY (in general, cycle WI corresponds to transcription or repression of W due to transcription factor I) several steps are performed:

Step 1:
Set the kinetic parameters $k_1^{WI}$ and $k_{-1}^{WI}$
State the net reaction flux as $l_1^{WI}=k_1^{WI}[D_W][I]-k_{-1}^{WI}[D_{WI}]$
State the net change in chemical potential as $$\Delta\mu_1^{WI} = \Re T \ln\left(\frac{k_{-1}^{WI}[D_{WI}]}{k_1^{WI}[D_W][I]}\right)$$

Step 2:
Set the kinetic parameters $k_2^{WI}$ and $k_{-1}^{WI}$
State the net reaction flux as $l_2^{WI}=k_2^{WI}[D_{WI}]-k_{-2}^{WI}[RD_{WI}]$
State the net change in chemical potential as $$\Delta\mu_2^{WI} = \Re T \ln\left(\frac{k_{-2}^{WI}[RD_{WI}]}{k_2^{WI}[D_{WI}]}\right)$$

Step 3:
Set the kinetic parameters $k_2^{WI}$ and $k_{-2}^{WI}$
State the net reaction flux as $l_2^{WI}=k_2^{WI}[RD_{WI}]-k_{-2}^{WI}[D_W][I_W][P_W]$
State the net change in chemical potential as $$\Delta\mu_3^{WI} = \Re T \ln\left(\frac{k_{-3}^{WI}[D_W][I_W][R_W]}{k_3^{WI}[RD_{WI}]}\right)$$

If $1^{WI}=1$ (i.e., I is an activator of W), $[P_1W]=[W]$. If $1^{WI}=0$ (i.e., I is a repressor of W), $[P_W]=1$.

Next, for each of the involved species, the mass conservation equations are determined. This includes transcription factors (A, B, X, Y, Z), released cofactors ($A_Y, X_Y, B_Z, X_Z, Y_Z, XY_Z$, or in general, $I_W$), and occupied DNA sites (in general, $[D_W], [D_{WI}]$ and $[RD_{WI}]$), resulting in a set of 24 ordinary differential equations. Next, using the conservation equation of the total available sites:

$$[D_Y]_{tot} = [D_Y] + \sum_{I=(A,X)} [[D]_{YI}] + \sum_{I=(A,X)} [[RD]_{YI}]$$

$$[D_Z]_{tot} = [D_Z] + \sum_{I=(B,X,Y,XY)} [[D]_{ZI}] + \sum_{I=(B,X,Y,XY)} [[RD]_{YI}]$$

The steady state equations are then solved to find the concentrations of the involved species. Next, the net change in chemical potential and the net flux for each step in each cycle may be calculated. Next, the total Heat Dissipation Rate (HDR) may be calculated:

$$HDR = \sum_{cycle} \sum_{step} (J\Delta\mu)$$

Next, the external consumption flux of X may be calculated $$l_X = l_1^{YX} + l_1^{ZX} + l_1^{ZXY} + \alpha[X]$$

Finally, using the above results, the Specific Dissipation Energy (SDE) may be calculated:

$$SDE = HDR/l_x$$

In ST 211, the Pareto averaged SDE may be computed by taking the average of the calculated SDE points on the Pareto frontier, or on a defined portion of the Pareto frontier.

In ST 213, if there is another subgraph from the target subset to analyze, the process returns to ST 201. If all subgraphs from the target subset have been analyzed, the process ends.

FIGS. 3A-3C show an example of the result of the above described optimization procedure and subsequent calculation of SDE at three points along the Pareto frontier according to one or more embodiments of the invention. FIG. 3A shows the full set of subgraphs having three nodes. The feed forward loop (FFL) is shown as subgraph 5.

In this example, the target circuit objective of this TRN is to produce the steady state fluxes $J_y$ and $J_z$, as shown in the cyclic model depicted in FIG. 3B. As both external fluxes of Y and Z are desired to be maximized when X is externally provided, there is a tradeoff region between these two objective functions: when more Y is taken out of the system (higher $J_y$), the concentration of Y goes down and its contribution towards further transcription of Z decreases, leading to lower $J_z$, and vice versa. In addition, the relevant parameters for a cyclic kinetic model of a coherent type 1 FFL and constraints used for the multi-objective optimization are summarized in FIG. 3B.

The multi-objective optimization goal is to maximize $J_y$ and $J_z$. The objective functions are simultaneously optimized subject to a set of constraints to obtain the Pareto frontier of maximization, as described above in reference to FIGS. 1-2. This Pareto frontier is shown in FIG. 3C. In this example, SDE values are calculated for three points 303, 305, and 307 on the Pareto frontier for the coherent FFL subgraph. The Pareto-averaged SDE may be obtained by determining the average of these three values.

Figure 4:
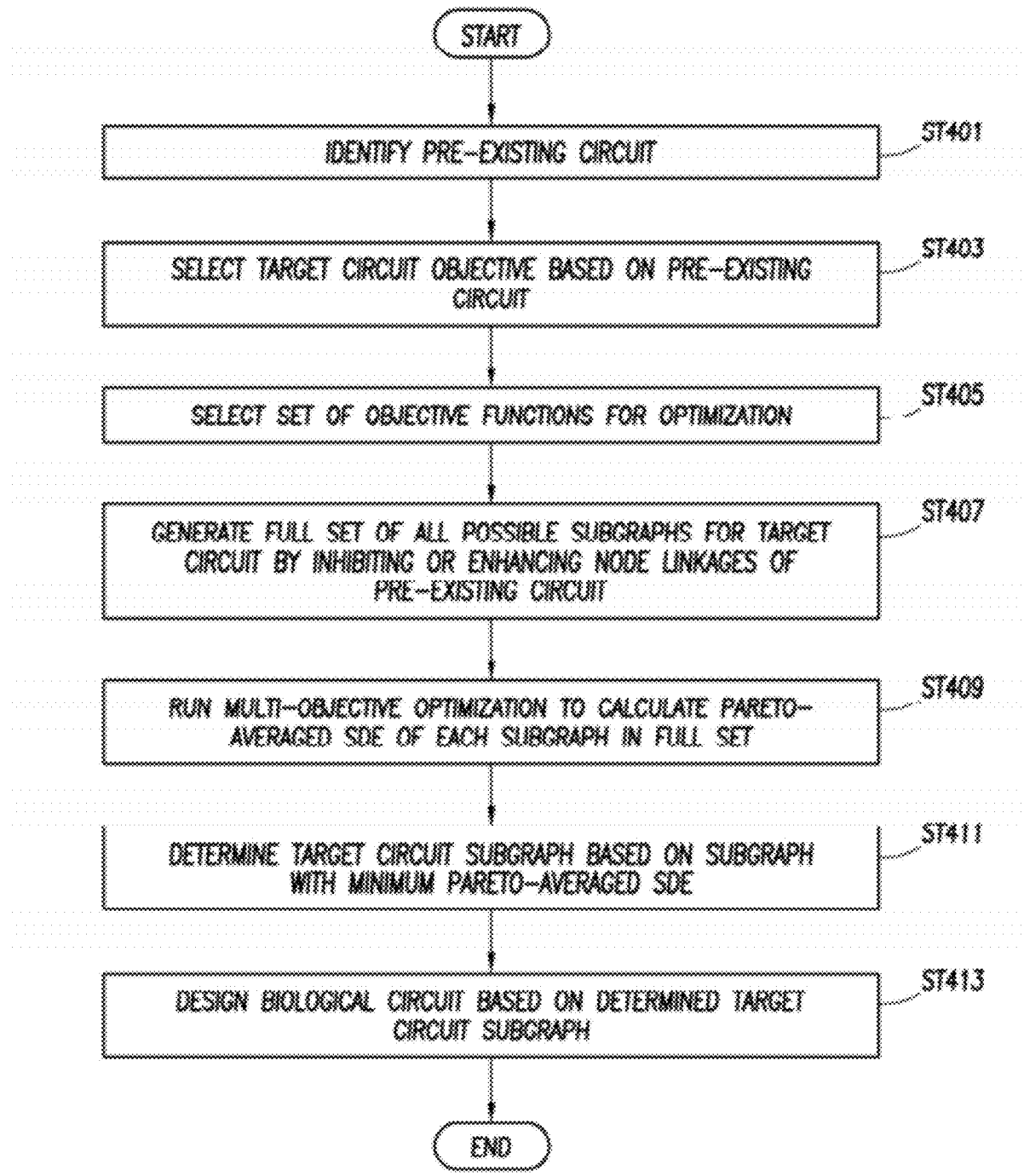
FIG. 4 shows a method in accordance with one or more embodiments.

FIG. 4 shows a method in accordance with one or more embodiments of the invention. While the various steps in the flowchart are presented and described sequentially, one of ordinary skill will appreciate that some or all of the steps may be executed in different orders, may be combined, or omitted, and some or all of the steps may be executed in parallel.

In ST 401, a pre-existing biological circuit is selected. For example, a TRN subgraph such as the general FFL, shown as subgraph 5 in FIG. 3A, may be identified. In ST403, a target circuit objective is selected using the structure of the pre-existing circuit as a guide. For the case of the FFL example, the target circuit objective may be to produce the steady state fluxes $J_y$ and $J_z$. For example, a subgraph with the same number of nodes and linkages to the pre-existing circuit (e.g., 3 nodes and 3 linkages for the FFL) may be selected. In ST 405, a set of objective functions for optimization based on the target circuit objective is selected. Accordingly, the objective functions used in the optimization are a set of functions that quantify the fluxes $J_y$ and $J_z$. These functions may be obtained in a variety of ways, for example, from a cyclic kinetic TRN model.

Figure 5A:
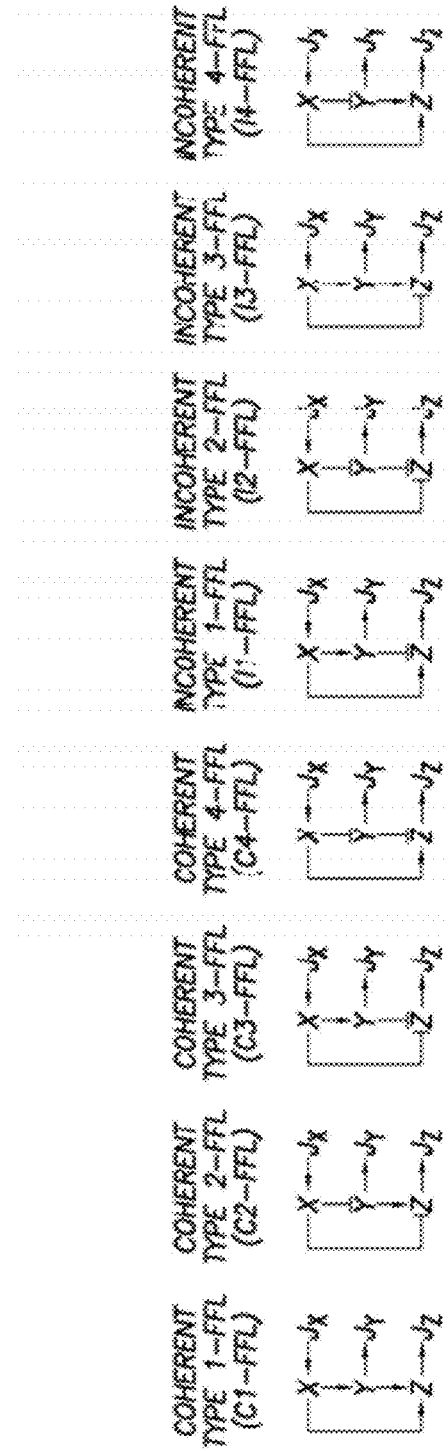
FIGS. 5A-5C show examples in accordance with one or more embodiments.

In ST 407, a set of all possible circuit subgraphs for the target circuit is generated by simulating inhibiting or enhancing of the node linkages of the pre-existing circuit. Using a TRN for example only, linkages may be enhanced or inhibited by linking the nodes via a transcription factor activator or a transcription factor repressor, respectively. Transcription factor activators and repressors are biological molecules that enhance and inhibit, respectively, gene transcription. An example of a set of all possible TRN subgraphs for the FFL is shown in FIG. 5A and represent coherent type 1-4 FFLs and incoherent type 1-4 FFLs. In this example, the set of 8 subgraphs is generated by considering all possible ways of replacing one, two, or three activator linkages with repressor linkages. In ST 409, the multi-objective optimization is executed to calculate the Pareto-averaged SDE of each circuit subgraph in the full set. In one embodiment of the invention, the multi-objective optimization is executed to optimize the objective functions specified in ST 405.

The multi-objective optimization and Pareto-averaged SDE calculation in ST 409 may be performed using the full set of all possible subgraphs generated in ST 407 in a manner substantially similar to that and described above, with reference to FIG. 2.

In ST 411, the target circuit subgraph, or set of target circuit subgraphs, is determined as the circuit subgraph, or set of circuit subgraphs, with the minimum Pareto-averaged SDE (relative to all other circuit subgraphs or sets of circuit subgraphs for which the Pareto-averaged SDE is calculated). Accordingly, for the example shown in FIG. 5C, the C1-FFL, C3-FFL, I1-FFL, and I3-FFL may be chosen as the set of target circuit subgraphs having the minimal Pareto-averaged SDE.

In step ST413, the target circuit subgraph, or set of target circuit subgraphs may then be designed and/or constructed or further used as fundamental subgraphs for the design and/or construction more complex synthetic biological circuits having optimal energetic cost, high overall robustness, etc.

Figure 5C:
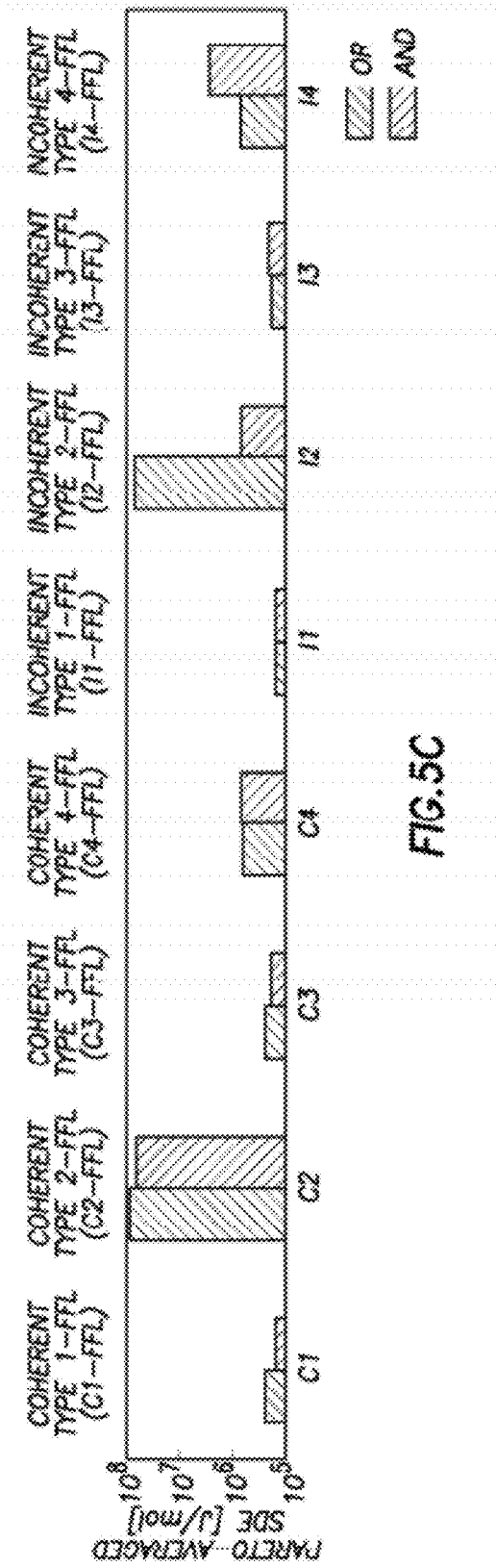
Figure 5B:
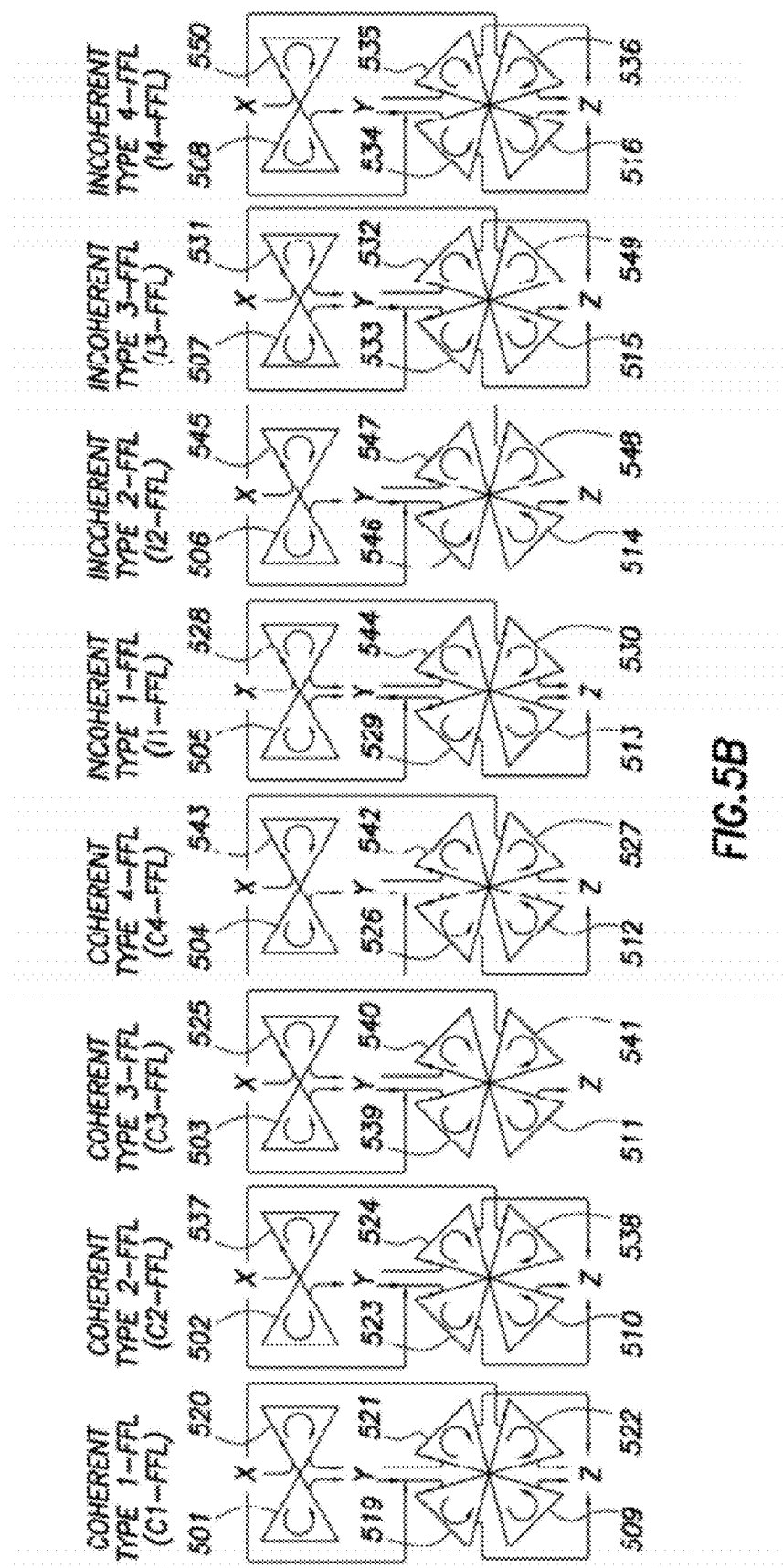

FIG. 5A shows examples of a full set of circuit subgraphs as would be generated in ST 407 for the FFL subgraph. FIG. 5B shows each model circuit subgraph including a symbolic representation of the corresponding cycles involved in each subgraph. A more detailed description of the detailed steps involved in a regulatory cycle is found in the Examples section below. Cycles 501-516 represent basal activity cycles. Cycles 519-536 represent transcriptor activity cycles. Cycles 537-550 represent repression activity cycles. FIG. 5C shows for each subgraph model the calculated Pareto-averaged SDE values resulting from ST 409 (for both AND and OR logic configurations).

Figure 6:
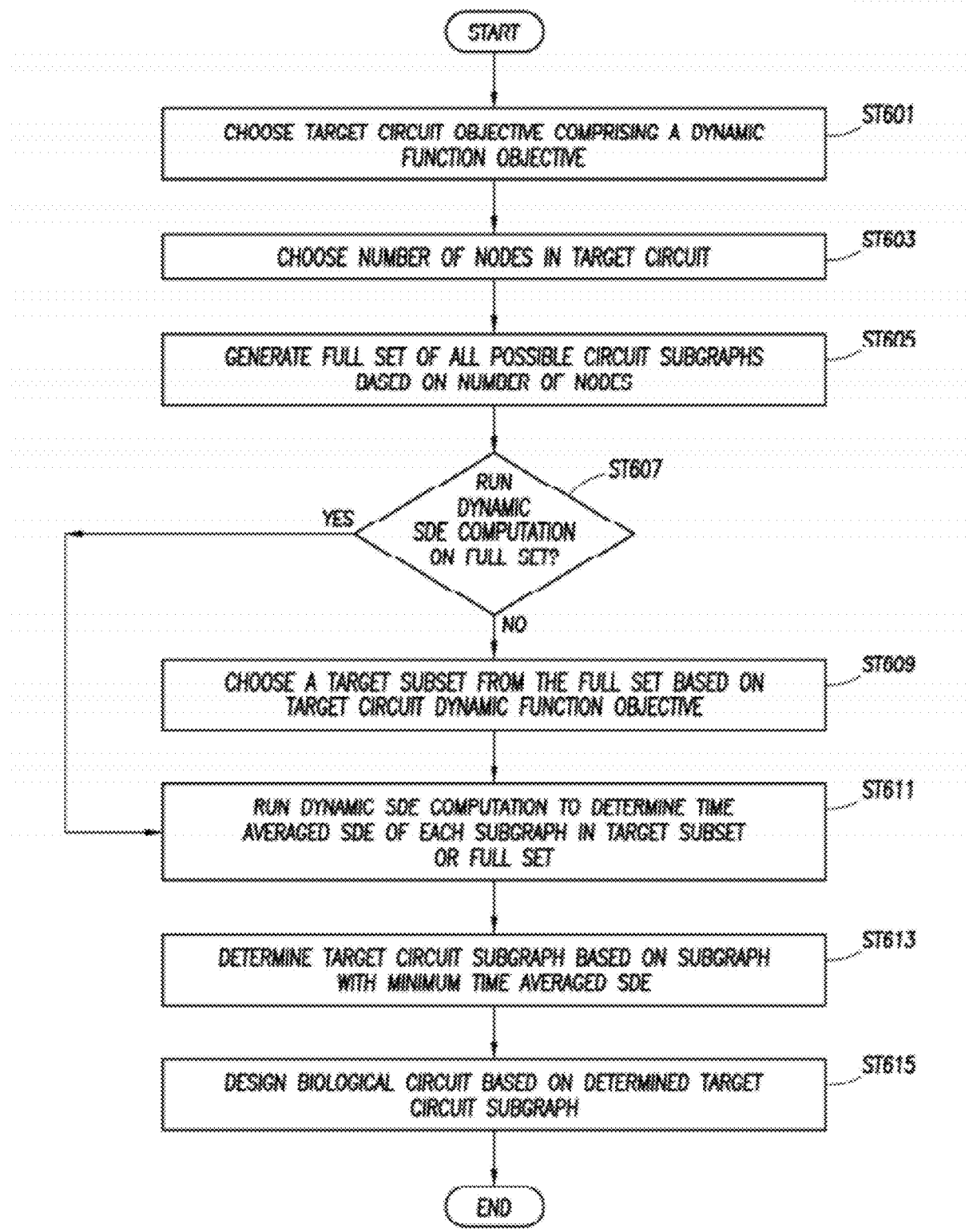
FIG. 6 shows a method in accordance with one or more embodiments.

FIG. 6 shows a method in accordance with one or more embodiments. While the various steps in the flowchart are presented and described sequentially, one of ordinary skill will appreciate that some or all of the steps may be executed in different orders, may be combined, or omitted, and some or all of the steps may be executed in parallel.

Figure 8A:
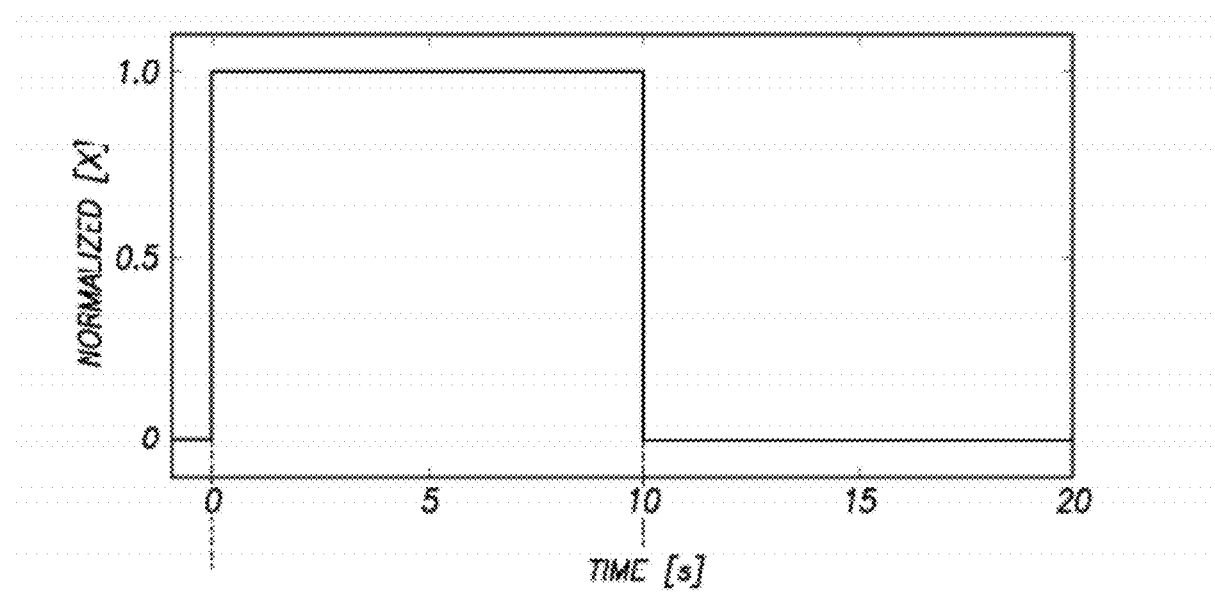
Figure 10A:
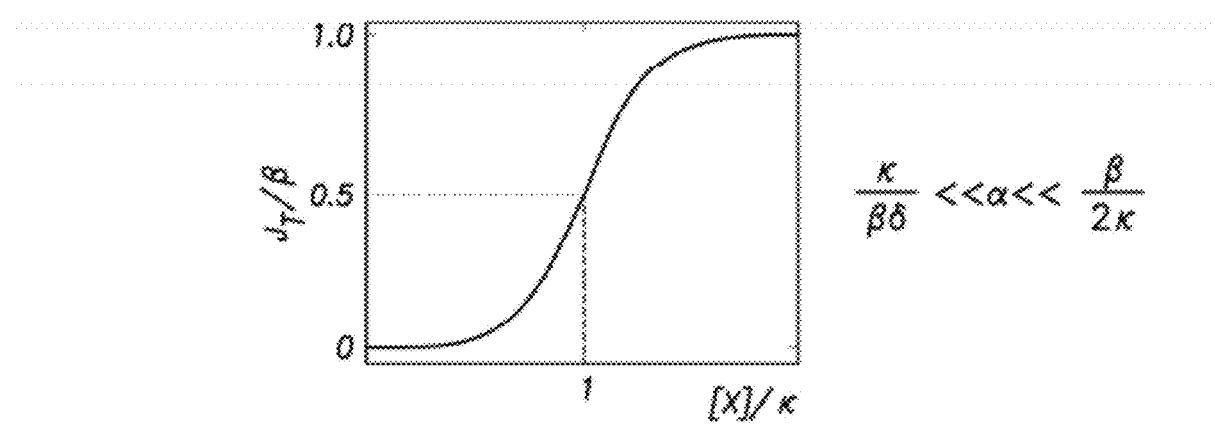
FIGS. 10A-10C show examples in accordance with one or more embodiments.
Figure 8B:
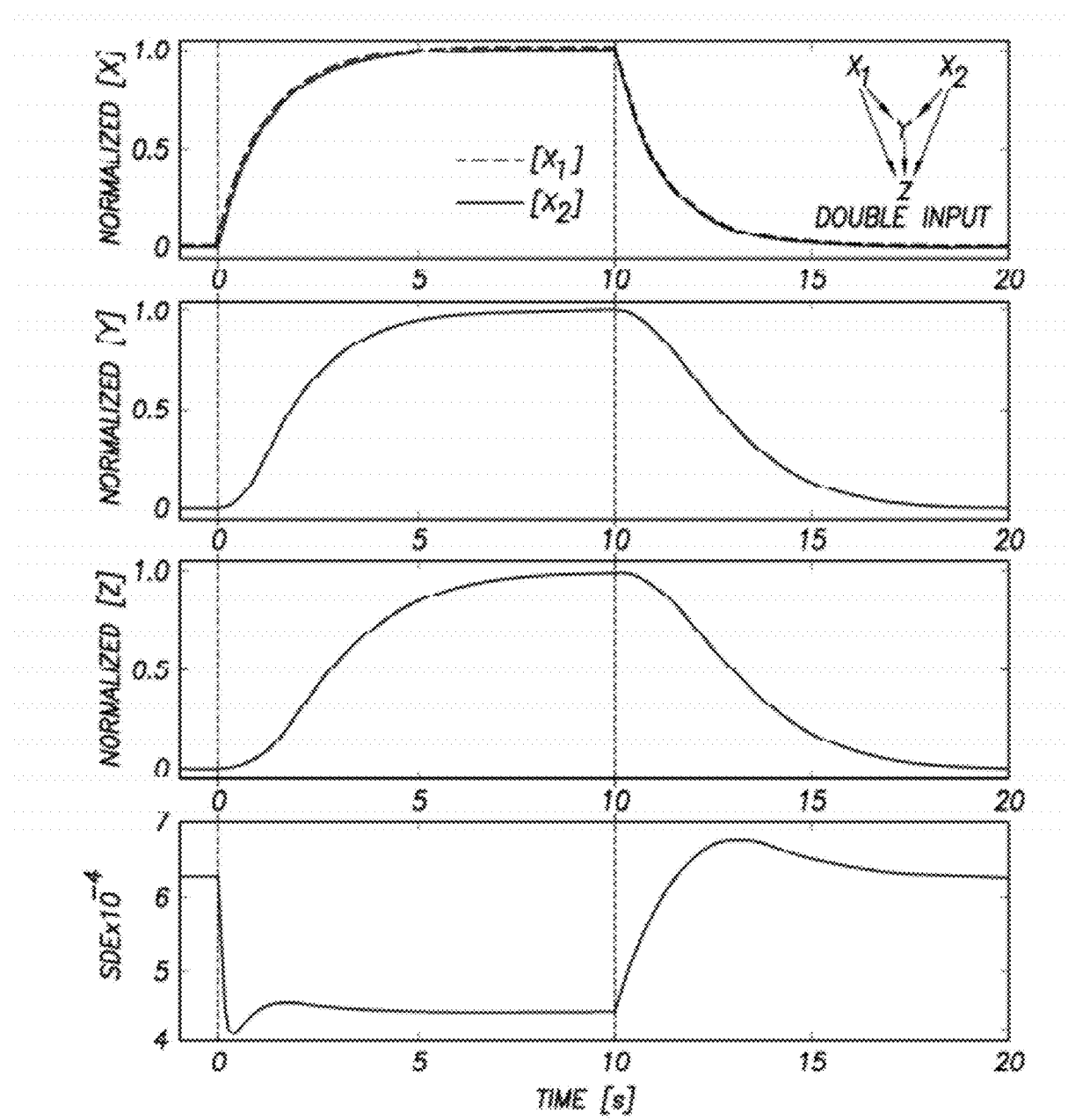

In ST 601, the a target circuit objective comprising a dynamic function objective is selected. For example, the user may select pulse generation as a dynamic function objective, as shown in FIGS. 8A-8C. In ST 603, the number of nodes in the target circuit is selected. In ST 605, a full set of all possible circuit subgraphs with the chosen number of nodes is generated.

In ST 607, a determination is made about whether to execute the dynamic SDE computation procedure using the full set of circuit subgraphs or execute the computation procedure using a subset of circuit subgraphs. If the dynamic SDE computation is executed using the subset, the full set is reduced to a target subset in ST 609 by eliminating circuit subgraphs that do not accomplish the target circuit dynamic function objective. For example, the full set for 3 nodes contains many different circuit subgraphs. If the target circuit dynamic function objective requires a pulse output, circuit subgraphs that cannot produce a pulse output are removed from the full set to create the target subset. In ST 611, a dynamic SDE computation procedure is executed to compute the time-averaged SDE for each subgraph in the target subset or full set based on a cyclic kinetic TRN model. In ST 613, the target circuit subgraph, or set of subgraphs, is determined by selecting the subgraph, or set of subgraphs, with the minimum time-averaged SDE.

In step ST615, the target circuit subgraph, or set of target circuit subgraphs may then be designed and/or constructed or further used as fundamental subgraphs for the design and/or construction more complex synthetic biological circuits having optimal energetic cost, high overall robustness, etc.

Figure 7:
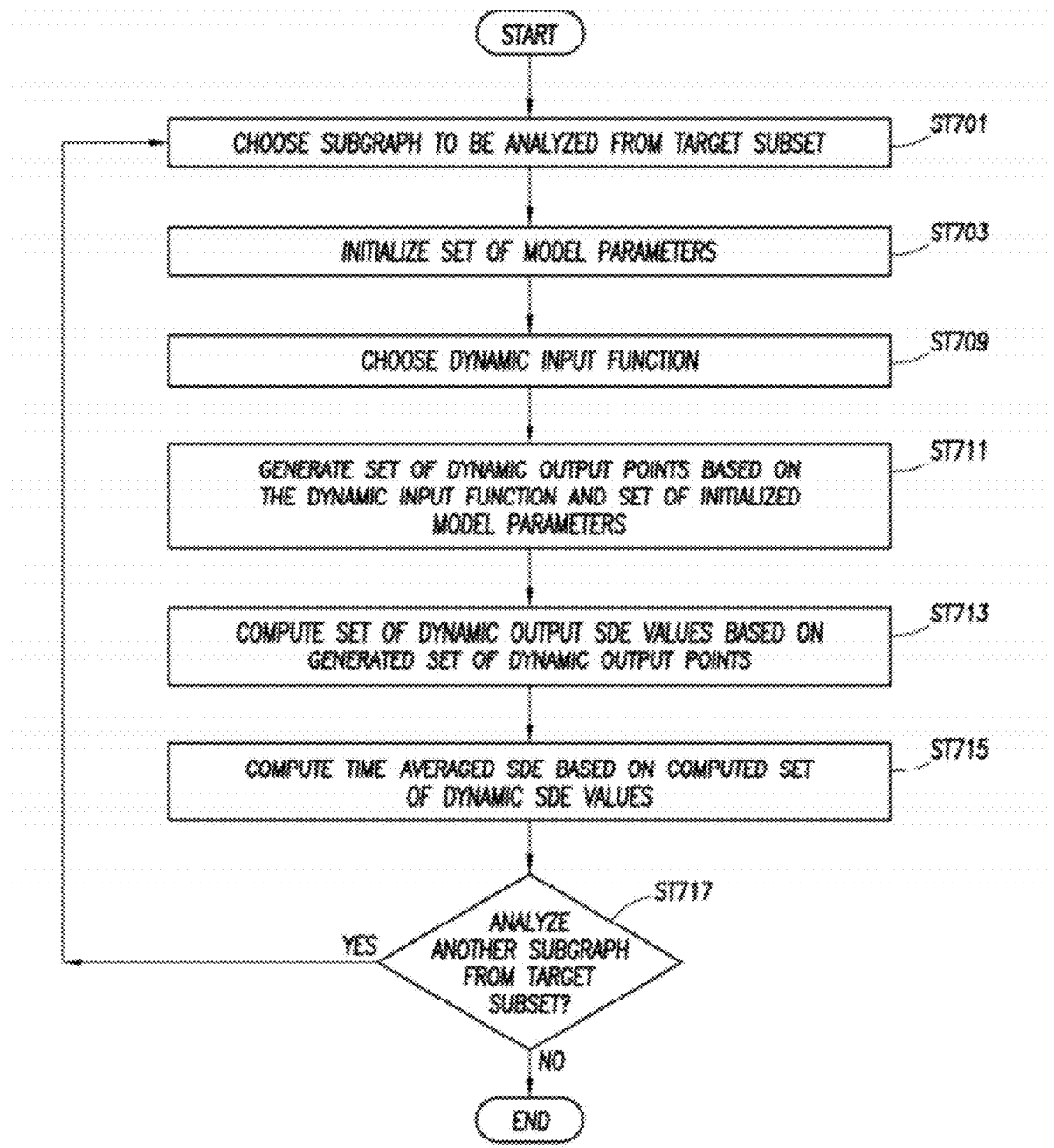
FIG. 7 shows a method in accordance with one or more embodiments.

FIG. 7 shows a method illustrating the steps involved in the dynamic SDE computation procedure procedure of ST 611 in FIG. 6 in accordance with one or more embodiments of the invention. In ST 701, a circuit subgraph is selected from the target subset. In ST 703, the set of model parameters are initialized for the selected subgraph based on the target circuit steady state objectives. An example of the initialization parameters for the example of a double input FFL (2X-FFL) is shown in FIG. 8C. In addition, the following parameters were initialized: T=298 K, [A]=[B]=$10^{-6}$ nM, $[D_y]_{tot}$= $[D_z]_{tot}$=1 nM, $\alpha$=1 [s$^{-1}$], and J=0 (for all the species). Initialization values for the model parameters depend not only on the model being used but may also depend on the what is known about the particular subgraph being modeled. The details of a cyclic kinetic TRN model that may be used in accordance with one or more embodiments of the invention is described in more detail below with reference to the examples and FIGS. 12-14. Furthermore, one of ordinary skill will appreciate that other models may be used that correspond to the type of circuit or network being designed, e.g., metabolic networks or stem cell regulatory networks, etc.

In ST 709, a dynamic input function is generated based on the dynamic function objective. For example, FIGS. 8A and 8B (top panel) shows a square pulse dynamic input function. In ST 711, a set of dynamic output points is generated based on the dynamic input function and the set of Pareto frontier points. More specifically, the dynamic response of the selected subgraph is simulated using a cyclic kinetic TRN model. FIG. 8B shows examples of sets of dynamic output points (normalized concentration of proteins Y and Z, i.e., [Z] and [Y], vs. time) for the double input 2X-FFL shown in the top panel of FIG. 8B.

In ST 713, a set of dynamic output SDE values are computed based on the generated set of dynamic output points. More specifically, the dynamic output SDE is calculated for each dynamic output point. The SDE may be calculated using the cyclic kinetic TRN model and Eq. 1. An example of the dynamic output SDE is shown in the bottom panel of FIG. 8B.

In ST 715, the time-averaged SDE is computed based on the computed set of dynamic output SDE values. More specifically, the time-averaged SDE is computed according to the equation:

$$\langle SDE \rangle = \frac{1}{t_R} \int_{t_R} SDE(t)\,dt [\text{J/mol}]$$

where SDE(t) is the dynamic output SDE and $t_R$ is the response time of the system and is defined as the time required for the system to return to the initial steady state within 1% error.

In ST 717, if there is another subgraph from the target subset to analyze, the process returns to ST 701. If all subgraphs from the target subset have been analyzed, the process ends.

Figure 9:
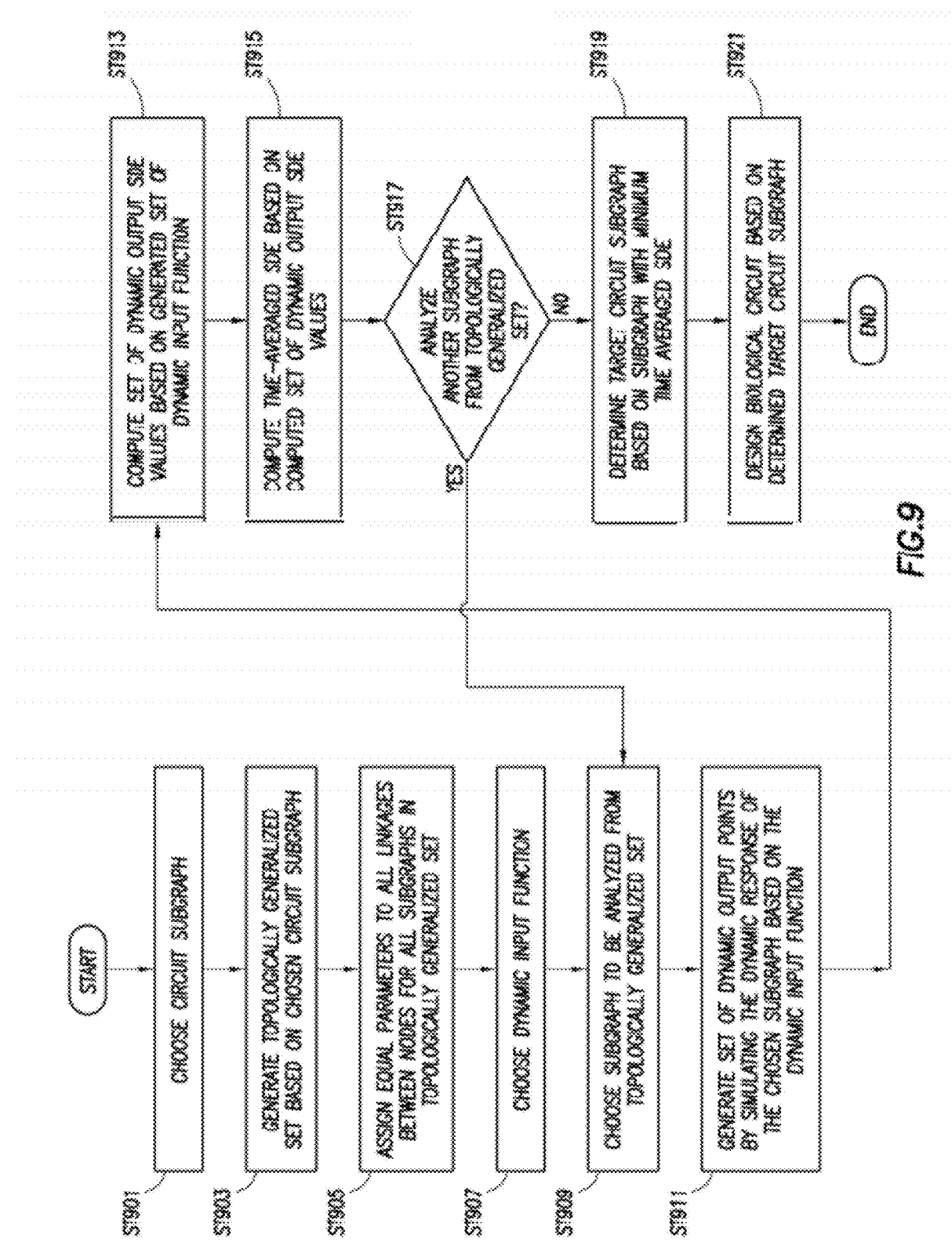
FIG. 9 shows a method in accordance with one or more embodiments.

FIG. 9 shows a method in accordance with one or more embodiments. While the various steps in the flowchart are presented and described sequentially, one of ordinary skill will appreciate that some or all of the steps may be executed in different orders, may be combined, or omitted, and some or all of the steps may be executed in parallel. More specifically, FIG. 9 shows an example of an SDE based pulsed energetics topological generalization prediction (PETGP) process in accordance with one or more embodiments of the invention. In accordance with one or more embodiments of the invention, the PETGP process may be used to identify target circuit subgraphs within large sets of topologically generalized subgraphs.

In ST 901 a base circuit subgraph is selected. In ST 903, a topologically generalized set of subgraphs is generated based on the selected base circuit subgraph. For example, FIGS. 11A-11B show examples of topological generalizations of various TRN motifs (i.e., commonly recurring subgraphs found in regulatory networks). For example, the single input module motif (SIM) may be topologically generalized to the subgraphs SIM(M,N); the FFL motif can be topologically generalized to the subgraphs FFL(M,N,L); the BIFAN motif may be generalized to the Dense Overlapping Regulons subgraphs DOR(M,N); and the 3-node simple regulation motif may be topologically generalized to the Layered Network subgraphs LAY(M,N,P).

In ST 905, all parameters (e.g., transcription parameters, $\kappa$, $\beta$, etc.) for all linkages between nodes in each subgraph are assigned equal values. Accordingly, no knowledge is assumed about any relationship between gene activator linkages or any dynamic behavior. However, if such knowledge is available, (e.g., from experimental data, or numerical simulation), linkages may be assigned values based upon prior knowledge; however, prior knowledge is not necessary to perform the PETGP process. In accordance with one or more embodiments of the invention, for every linkage, any desired $\kappa$ and $\beta$ value may be assigned as long as the relationships $\kappa = k_2/k_1$ and $\beta = k_2[D]_{tot}$ are satisfied. Thus, assigning $\kappa$ and $\beta$, allows the determination of the following kinetic parameters: $k_1$, $k_2$, $k_3$, and $[D]_{tot}$. When all the kinetic parameters are assigned, the network is fully characterized except for the degradation rate $\alpha$ which is the same for all the proteins in the network and needs to satisfy the following constraint: $\kappa/\beta\delta \ll \alpha \ll \beta/2\kappa$, where $\delta = k_3/(k_{-1}k_{-2}k_{-3}[D]_{tot}^2)$.

Figure 10B:
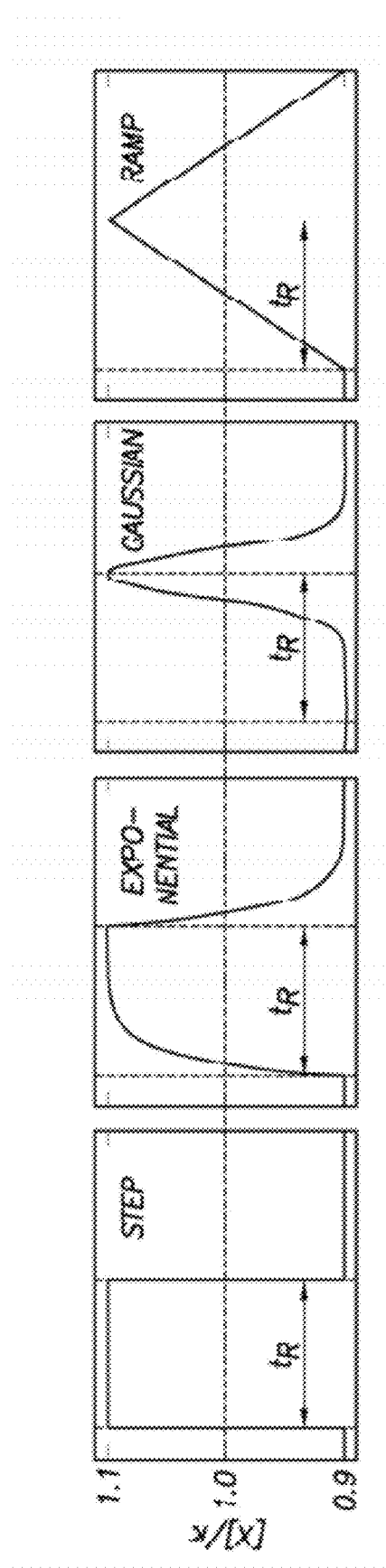

In ST 907, a dynamic input function is chosen. FIG. 10B shows four examples of possible dynamic inputs functions: step, exponential, Gaussian, and ramp. The PETGP system is robust (i.e., is not dramatically affected) with respect to the choice of dynamic input function. Accordingly, the particular input function is not limited to merely the examples described herein.

All dynamic input functions may be characterized by an ON pulse duration $t_X$. Furthermore, in accordance with one or more embodiments, the amplitude of the dynamic input function is chosen such that the TRN system is given a small perturbation. In accordance with one or more embodiments, a dynamic input function may have an off level of 0.9$\kappa$ and an on level of 1.1$\kappa$, as shown in FIG. 10B, where $\kappa$ is the concentration of transcription factor X required to reach half of the maximal transcription rate. One of ordinary skill will appreciate that other amplitude choices may be made without departing from the scope of the present disclosure.

In ST 909, a subgraph to be analyzed is selected from the topologically generalized set. In ST 911, a set of dynamic output points are generated by simulating the dynamic response of the selected subgraph based on the dynamic input function. In ST 913, the dynamic energetic response, i.e., the set of dynamic SDE values is computed based on the generated set of dynamic output points. In accordance with one or more embodiments, the set of dynamic SDE values required for attaining the dynamic function is computed using a cyclic kinetic TRN model.

Figure 10C:
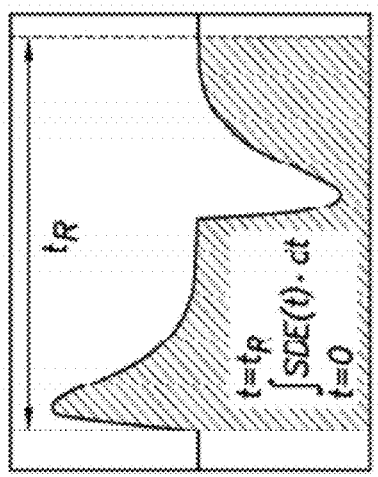

In ST 915, the time-averaged SDE is computed according to the equation:

$$\langle SDE \rangle = \frac{1}{t_R} \int_{t_R} SDE(t)\, dt,$$

where $t_R$ is the response time of the system and is defined as the time required for the SDE to reach 0.1% of the initial steady state value. FIG. 10C shows a schematic diagram of the dynamic energetic response, i.e., the set of dynamic SDE values, and a diagram showing how the time-averaged SDE may be calculated.

In ST 917, a decision is made to analyze another subgraph if there are any remaining in the topologically generalized set. If another subgraph is to be analyzed, the process returns to ST 909, otherwise, the process proceeds to ST 919. In ST 919, the target circuit subgraph, or set of subgraphs, is identified as the topologically generalized subgraph, or set of subgraphs, having the lowest time-averaged SDE.

In step ST921, the target circuit subgraph, or set of target circuit subgraphs may then be designed and/or constructed or further used as fundamental subgraphs for the design and/or construction more complex synthetic biological circuits having optimal energetic cost, high overall robustness, etc.

The methods shown in FIGS. 1, 2, 4, 6, 7, and 9 may be used to efficiently design synthetic biological circuits using, for example, biological molecules. The methods shown in FIGS. 1, 2, 4, 6, 7, and 9 provide a process by which the vast design parameter space of a biological circuit may be dramatically reduced. Accordingly, during the process of designing a biological circuit, the SDE based optimization methods described above may be executed on processor that is part of a larger system for designing synthetic biological circuits, or, more generally, for designing complex synthetic biological networks. The system may include actual raw materials for designing synthetic biological circuits with controls over those materials that are based on the output of the methods shown in FIGS. 1, 2, 4, 6, 7, and 9. In short, the design and construction of a synthetic biological circuit or network is guided and aided by the selected target circuit subgraphs that are produced as output from the methods of FIGS. 1, 2, 4, 6, 7, and 9.

With the benefit of the above methods, a system for designing synthetic biological circuits may construct a biological circuit based on the set of target circuit subgraphs (i.e., the biological circuits having the lowest energetic cost in the form of lowest SDE). For example, the set of target circuit subgraphs may be used as starting points (or templates) for designing and constructing synthetic biological circuits having optimal energetic cost, high overall robustness, etc. Embodiments of the invention may also decrease the amount of experimentation required to (i) understand how the biological circuit works and/or (ii) which biological circuit (along with which linkages to repress and/or induce in to transcripting) should be built to achieve the target circuit objective.

One of ordinary skill will appreciate that the methods outlined in FIGS. 1, 2, 4, 6, 7, and 9 may be applied in other synthetic networks outside of the simple TRN examples used herein for sake of simplicity. For example, one of ordinary skill will appreciate that the methods described herein may be applied to metabolic networks and/or the complex regulatory networks involved in stem cells without departing from the scope of the present disclosure.

Examples of Cyclic Kinetic TRN Models

The following examples illustrate simple examples of cyclic kinetic TRN models that may be used to calculate HDR and J and, thus, the SDE, in accordance with one or more embodiments of the invention. For example, in ST205 shown in FIG. 2 the following multi-objective optimization problem must be solved:

Maximize $(J_Y, J_Z)$
$\vec{x}$ subject to:

$f(\vec{x}) = 0$ $HDR_{lb} \leq HDR \leq HDR_{ub}$ $\vec{x}_{lb} \leq \vec{x} \leq \vec{x}_{ub}$ The equality constraint $f(\vec{x}) = 0$ represents a set of nonlinear mass balance equations at steady state for the selected subgraph that are imposed by a cyclic kinetic TRN model and $\vec{x} = [[X], J_Y, J_z]^T$. Accordingly, the examples below illustrate one example of a cyclic TRN model that may be used to determine the mass balance equations, HDR, and output fluxes for a given set of input fluxes $J_x$ having concentrations [X]. The following examples will illustrate how to calculate HDR, the output fluxes, and SDE based on input fluxes X. For the sake of simplicity three simple examples of TRNs are chosen: X transcribes Z, X represses Z, and X, Y regulate the transcription of Z. (See, FIGS. 12, 13, and 14 respectively). These examples are used herein for explanatory purposes only and are not meant to limit the scope of the present invention.

EXAMPLE 1

X Transcribes Z

Figure 12A:
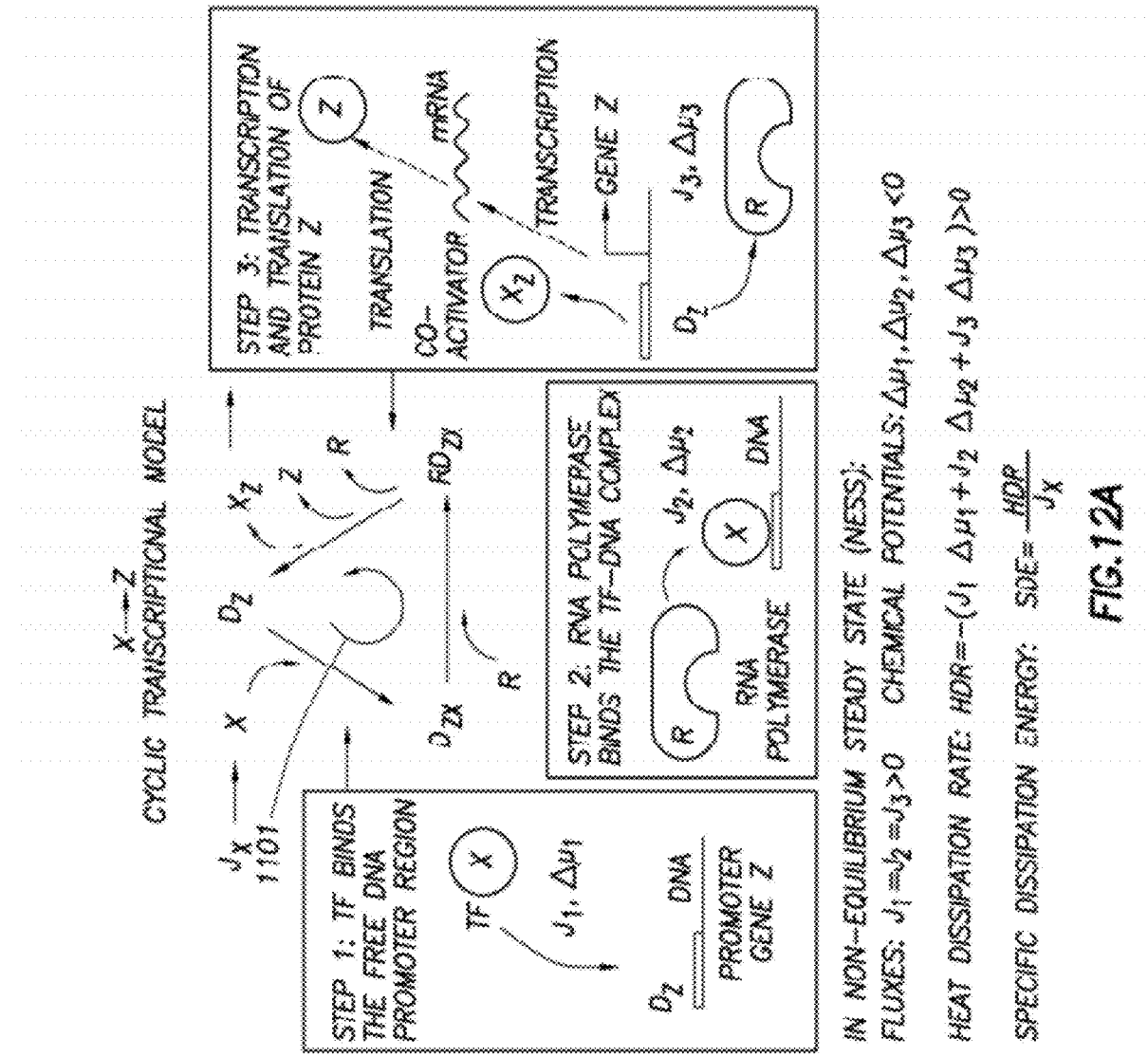
FIGS. 12A-12B shows examples in accordance with one or more embodiments.

The mechanism by which the protein Z is transcribed by the transcription factor X is divided in a three-step process as shown in FIG. 12A.

First, the transcription factor X binds a free DNA site of the promoter region of protein Z ($D_Z$) to form a complex ($D_{ZX}$): $D_Z + X \leftrightarrow D_{ZX}$. If $k_1^{ZX}$ [$s^{-1} \cdot nM^{-1}$] and $k_{-1}^{ZX}$ [$s^{-1}$] are the forward and backward kinetic constants, respectively, then the net flux for this reaction is given by $$J_1^{ZX} = k_1^{ZX}[D_Z][X] - k_{-1}^{ZX}[D_{ZX}] \qquad (2)$$

and the reaction chemical potential can be estimated as:

$$\Delta \mu_1^{ZX} = \Re T \ln\left(\frac{k_{-1}^{ZX}[D_{ZX}]}{k_1^{ZX}[D_Z][X]}\right) = \Re T \ln\left(\frac{[D_{ZX}]}{K_1^{ZX}[D_Z][X]}\right) \qquad (3)$$

where $\Re$ [$J \cdot K^{-1} \cdot mol^{-1}$] is the gas constant, T [K] is the absolute temperature and $K_1^{ZX} = k_1^{ZX}/k_{-1}^{ZX}$ [$nM^{-1}$] is the association equilibrium constant.

Second, RNA polymerase (R) binds $D_{ZX}$ and forms a complex ($RD_{ZX}$): $R + D_{ZX} \leftrightarrow RD_{ZX}$. If $k_2^{ZX}$ [$s^{-1} \cdot nM^{-1}$] and $k_{-2}^{ZX}$ [$s^{-1}$] are the forward and backward kinetic constants for this step, respectively then net flux for this reaction can be written as:

$$J_2^{ZX} = k_2^{ZX}[R][D_{ZX}] - k_{-2}^{ZX}[RD_{ZX}] = k_2^{ZX}[D_{ZX}] - k_{-2}^{ZX}[RD_{ZX}] \quad (4)$$

where $k_2^{ZX} = k_2^{ZX}[R]$ [s$^{-1}$] is a pseudo-first order kinetic constant. If $K_2^{ZX} = k_2^{ZX}/k_{-2}^{ZX}$ is the association equilibrium constant for this reaction, then the reaction chemical potential is given by $$\Delta \mu_2^{ZX} = \Re T \ln\left(\frac{k_{-2}^{ZX}[RD_{ZX}]}{k_2^{ZX}[D_{ZX}]}\right) = \Re T \ln\left(\frac{[RD_{ZX}]}{K_2^{ZX}[D_{ZX}]}\right) \quad (5)$$

Third, once RNA polymerase is bound, there is a transcription step to form mRNA and then a translation step which requires recruitment of the amino acids (AA$_Z$) required to form the protein Z. In this example, for the sake of simplicity, the aforementioned steps have been combined: RD$_{ZX}$ + AA$_Z$ ↔ R+D$_Z$+X$_Z$+Z. Note that as a result of transcription of Z, RNA polymerase molecules are released, thus freeing the DNA site and releasing the bound co-activator (X$_Z$). If $k_3^{ZX} = k_3^{ZX}[AA_Z]$[s$^{-1}$] and $k_{-3}^{ZX} = k_{-3}^{ZX}[R]$ [s$^{-1}$·nM$^{-2}$] are pseudo-first order kinetic constants, and $K_3^{ZX} = k_3^{ZX}/k_{-3}^{ZX}$ [nM$^2$] is the association equilibrium constant for this reaction, then the net reaction flux and reaction chemical potential are given by:

$$J_3^{ZX} = k_3^{ZX}[RD_{ZX}] - k_{-3}^{ZX}[D_Z][X_Z][Z] \quad (6)$$

$$\Delta \mu_3^{ZX} = \Re T \ln\left(\frac{[D_Z][X_Z][Z]}{K_3^{ZX}[RD_{ZX}]}\right)$$

Figure 12B:
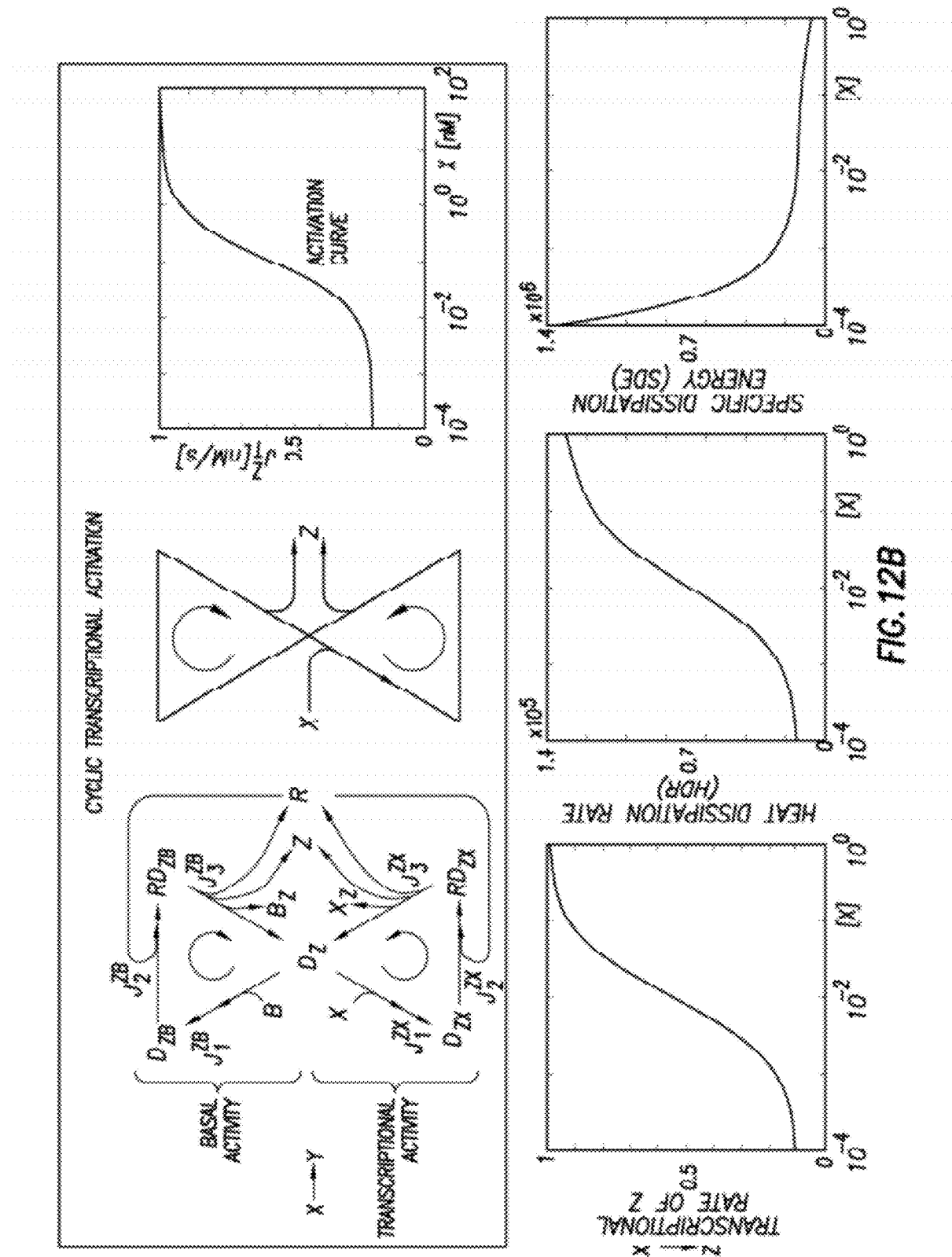

The described steps above are represented as a triangular cycle 1101 in FIG. 12A. In accordance with one or more embodiments, an analogous mechanism describes the basal activity in which a basal transcription factor B binds the free promoter region of Z, initiating the cycle and basal level transcription of Z as shown in FIG. 12B.

In accordance with one or more embodiments of the invention, the mass balance equations for the cycle described above may be determined as follows. As used herein, $J_i$ and $\alpha_i$ are defined as the external intake flux in [nM·s$^{-1}$] and the degradation rate in [s$^{-1}$] of the species i, respectively. Flux is defined positive for incoming flux and negative otherwise. The mass balance of all species in FIG. 12A-12B can be described by the following differential equations:

$$\frac{d[X]}{dt} = J_X - J_1^{ZX} - \alpha_X[X] \quad (7)$$

$$\frac{d[B]}{dt} = J_B - J_1^{ZB} - \alpha_B[B] \quad (8)$$

$$\frac{d[Z]}{dt} = J_3^{ZX} + J_3^{ZB} + J_Z - \alpha_Z[Z] \quad (9)$$

$$\frac{d[X_Z]}{dt} = J_3^{ZX} + J_{X_Z} - \alpha_{X_Z}[X_Z] \quad (10)$$

$$\frac{d[B_Z]}{dt} = J_3^{ZB} + J_{B_Z} - \alpha_{B_Z}[B_Z] \quad (11)$$

$$\frac{d[D_Z]}{dt} = J_3^{ZX} + J_3^{ZB} - J_1^{ZX} - J_1^{ZB} \quad (12)$$

$$\frac{d[D_{ZX}]}{dt} = J_1^{ZX} - J_2^{ZX} \quad (13)$$

$$\frac{d[D_{ZB}]}{dt} = J_1^{ZB} - J_2^{ZB} \quad (14)$$

$$\frac{d[RD_{ZX}]}{dt} = J_2^{ZX} - J_3^{ZX} \quad (15)$$

$$\frac{d[RD_{ZB}]}{dt} = J_2^{ZB} - J_3^{ZB} \quad (16)$$

Additionally, mass balance has to satisfy the DNA site balance equality constraint:

$$[D_Z]_{tot} = [D_Z] + [D_{ZX}] + [D_{ZB}] + [RD_{ZX}] + [RD_{ZB}] \quad (17)$$

In equation 9, the mass balance is between generated transcription factor Z through main cycle ($J_3^{ZX}$) and through basal cycle flux ($J_3^{ZB}$) incoming transcription factor Z flux (through different TF cycles, can be assumed negligible if Z is not generated through any other cycles) and the degradation of product Z. Here, X$_Z$ and B$_Z$ denotes the modified transcription factors released from the cycle after the transcription and translation process.

Steady State Solution.

At steady state, $J_1^{ZX} = J_2^{ZX} = J_3^{ZX} = J_C^{ZX}$, where $J_C^{ZX}$ [nM·s$^{-1}$] is the cyclic flux of cycle ZX. Analytical solution of the mass balance leads to:

$$J_C^{ZX} = \frac{[D_Z]_{tot}(k_1^{ZX}k_2^{ZX}k_3^{ZX}[X] + k_{-1}^{ZX}k_{-2}^{ZX}k_{-3}^{ZX}[X_Z][Z])}{k_{-1}^{ZX}k_{-2}^{ZX} + k_{-1}^{ZX}k_3^{ZX} + k_2^{ZX}k_3^{ZX} + (k_2^{ZX}+k_{-2}^{ZX}+k_3^{ZX})k_1^{ZX}[X] + (k_{-1}^{ZX}+k_2^{ZX}+k_{-2}^{ZX})k_{-3}^{ZX}[X_Z][Z]} \quad (18)$$

A similar equation can be found for the basal activity cyclic flux $J_C^{ZB}$. Since protein transcription is a highly irreversible process, one can expect that the rate of the forward reaction in each of the three steps, to be much higher than the rate of the corresponding backward reaction. This assumption shifts the entire thermodynamic analysis away from equilibrium. This contrasts many other postulated models where the forward and backward rates are assumed to be equal, leading to thermodynamic equilibrium and zero net flux. In this example assume that the order of magnitude for concentration of the species is the same, then by assuming $k_i^{ZX} \gg k_{-i}^{ZX}$ for i={1, 2, 3}, the cyclic flux ZX can be written as:

$$J_C^{ZX} \approx \frac{k_1^{ZX}k_2^{ZX}k_3^{ZX}k_2^{ZB}k_3^{ZB}[X][D_Z]_{tot}}{k_2^{ZX}k_3^{ZX}k_2^{ZB}k_3^{ZB} + k_1^{ZX}k_2^{ZB}k_3^{ZB}(k_2^{ZX}+k_3^{ZX})[X] + k_1^{ZB}k_2^{ZX}k_3^{ZX}(k_2^{ZB}+k_3^{ZB})[B]} \quad (19)$$

Let $J_T^Z$ be the total transcriptional rate of protein Z in [nM·s$^{-1}$], which is the sum of the transcription rate of Z due to the activity of transcription factor (TF) X, $J_T^{ZX}$, and the basal activity of basal TF B, $J_T^{ZB}$. Since protein Z is being transcribed in the third reaction of the proposed mechanism, $J_T^{ZX} = J_3^{ZX}$ and $J_T^{ZB} = J_3^{ZB}$. Thus, $J_T^Z = J_T^{ZX} + J_T^{ZB} = J_3^{ZX} + J_3^{ZB} = J_C^{ZX} + J_C^{ZB}$. For I=X, B is defined as:

$$\beta^{ZI} = \frac{k_2^{ZI}k_3^{ZI}[D_Z]_{tot}}{(k_2^{ZI}+k_3^{ZI})}, [nM \cdot s^{-1}] \quad (20)$$

-continued $$\text{and } \kappa^{ZI} = \frac{k_2^{ZI} k_3^{ZI}}{k_1^{ZI}(k_2^{ZI} + k_3^{ZI})}, [nM] \quad (21)$$

Then, the cyclic flux of ZX (eq. 17) and the corresponding flux for ZB can be written as follows:

$$J_C^{ZX} = \frac{\beta^{ZX}[X]}{\kappa^{ZX} + [X] + \frac{\kappa^{ZX}}{\kappa^{ZB}}[B]} \quad (22)$$

$$J_C^{ZB} = \frac{\beta^{ZB}[B]}{\kappa^{ZB} + [B] + \frac{\kappa^{ZB}}{\kappa^{ZX}}[X]} \quad (23)$$

In principle, $J_T^Z$ is a function of both activator [X] and [B]. However, if the concentration of the basal activator does not change in the system, then the transcription rate of Z is only a function of its main activator X. The basal and maximal transcription rates, $J_{T,Basal}^Z$ and $J_{T,Max}^Z$, are defined as the transcription rates when $[X] \to 0$ and $[X] \to \infty$, respectively:

$$J_{T,Basal}^Z = \frac{\beta^{ZB}[B]}{\kappa^{ZB} + [B]} \quad (24)$$

$$J_{T,Max}^Z = \beta^{ZX} \quad (25)$$

Notice that $J_{T,Basal}^Z$ is constant for a specified [B]. In addition, from equation 25, $\beta^{ZX}$ can be conceptually defined as the maximal transcription rate $J_{T,Max}^Z$ of protein Z due to the activity of its transcription factor X. This parameter includes a cooperativity term, $\omega^{ZX}$ deals with various input logics. The cooperativity term ($\omega^{ZX}$) quantifies the interaction between two proteins bound on two sites. As indicated earlier, each cycle represents the binding of a transcription factor on a DNA site to induce transcription. Hence, cooperativity term in our model explicitly allows binding interactions to be taken into account. In principle, $\beta^{ZX} = \tilde{\omega}^{ZX} \beta^Z$ where $\beta^Z$ is a common maximal transcription rate for all the cycles involved in the transcription of Z. Essentially, different $\beta^{ZI}$ values are obtained by incorporation of different cooperativity terms in the cycles, represented by $\tilde{\omega}^{ZI}$. In general, $\tilde{\omega}^{ZI}$ is low for OR input logic and high for AND input logics. Moreover, the concentration of X required to reach half of $(J_{T,Max}^Z - J_{T,Basal}^Z)$ known as the activation coefficient $K^X$ is determined by the following relationship between $\kappa^{ZX}$ and $\kappa^{ZB}$:

$$K^X = \kappa^{ZX}\left(\frac{[B] + \kappa^{ZB}}{\kappa^{ZB}}\right) \quad (26)$$

FIG. 12B shows the approximate solution for highly irreversible reactions far away from thermodynamic equilibrium. Note that the transcription rate of Z follows a first order Hill's function with basal transcriptional activity:

$$J_T^Z = J_{T,Basal}^Z + \frac{(J_{T,Max}^Z - J_{T,Basal}^Z)[X]}{K^X + [X]} \quad (27)$$

When X transcribes Z in absence of the basal activity $([B]=0, J_{T,Basal}^Z=0)$, then $$K^X = \kappa^{ZX} \text{ and} \quad (28)$$

$$J_T^Z = \frac{\beta^{ZX}[X]}{\kappa^{ZX} + [X]}$$

which is same as the first order Hill's equation.

In accordance with one or more embodiments of the invention, the method for determining the HDR is described below. Because the reactions described above are highly irreversible and thus are far apart from chemical equilibrium, the energy dissipated is high. As the reaction progresses, the rate at which energy is dissipated is expressed by the product between the flux and the chemical potential of reaction. Whereas, the total heat dissipation rate $HDR^Z [J \cdot s^{-1}]$ is given by the addition of the heat dissipated by each cycle:

$$HDR^Z = HDR^{ZX} + HDR^{ZB} = \quad (29)$$

$$-\left(\sum_{i=1}^{3} J_i^{ZX} \Delta\mu_i^{ZX} + \sum_{i=1}^{3} J_i^{ZB} \Delta\mu_i^{ZB}\right) = -\sum_{I=X,B} \sum_{i=1}^{3} J_i^{ZI} \Delta\mu_i^{ZI}$$

At steady state:

$$HDR^{ZI} = -(J_1^{ZI} \Delta\mu_1^{ZI} + J_2^{ZI} \Delta\mu_2^{ZI} + J_3^{ZI} \Delta\mu_3^{ZI}) = \quad (30)$$
$$-J_C^{ZI}(\Delta\mu_1^{ZI} + \Delta\mu_2^{ZI} + \Delta\mu_3^{ZI}) = -J_C^{ZI} \Delta\mu_C^{ZI}$$

where $$\Delta\mu_C^{ZI} = \Delta\mu_1^{ZI} + \Delta\mu_2^{ZI} + \Delta\mu_3^{ZI} = \Re T \ln\left(\frac{[I_Z][Z]}{K_1^{ZI} K_2^{ZI} K_3^{ZI}[I]}\right) \quad (31)$$

is defined as the chemical potential of the cycle for I=TFs X, B.

In this example, the specific dissipation energy (SDE) is defined by as the ratio between the heat dissipation rate to the input mass flux required to keep the system under nonequilibrium steady state (NESS) conditions:

$$SDE^Z = HDR^Z/J_X \quad (32)$$

The plots shown in FIG. 12B show the results for the transcription rate of Z, HDR, and SDE according to the model described above.

EXAMPLE 2

Repression of Z by X

Similar to the activation case, the mechanism of repression by repressor X can be divided in a three step process, similar to that shown in FIG. 12A:

First, as in the activation case, the transcription factor X (in this case repressor) binds a free DNA site of the promoter region of protein Z ($D_Z$) to form an occupied DNA site ($D_{ZX}$): $D_Z + X \leftrightarrow D_{ZX}$. If $k_1^{ZX} [s^{-1} \cdot nM^{-1}]$ and $k_{-1}^{ZX} [s^{-1}]$ are the forward and backward kinetic constants, respectively, and $K_1^{ZX} = k_1^{ZX}/k_{-1}^{ZX} [nM^{-1}]$ is the association equilibrium constant, then the net flux and the chemical potential for this reaction are:

$$J_1^{ZX} = k_1^{ZX}[D_Z][X] - k_{-1}^{ZX}[D_{ZX}] \quad (33)$$

-continued $$\Delta\mu_1^{ZX} = \Re T\ln\left(\frac{k_{-1}^{ZX}[D_{ZX}]}{k_1^{ZX}[D_Z][X]}\right) = \Re T\ln\left(\frac{[D_{ZX}]}{K_1^{ZX}[D_Z][X]}\right) \quad (34)$$

Second, since X is a repressor, RNA polymerase (R) cannot bind to the occupied DNA site ($D_{ZX}$). In turn, the X-bound site changes its configuration into another energetic state ($D_{ZX}^*$): $D_{ZX} \leftrightarrow D_{ZX}^*$. Let $k_2^{ZX}$ [s$^{-1}$] and $k_{-2}^{ZX}$ [s$^{-1}$] be the forward and backward kinetic constants, respectively, and $K_2^{ZX}=k_2^{ZX}/k_{-2}^{ZX}$ the association equilibrium constant. Then, the net flux and chemical potential for this step are:

$$J_2^{ZX} = k_2^{ZX}[D_{ZX}] - k_{-2}^{ZX}[D_{ZX}^*] \quad (35)$$

$$\Delta\mu_2^{ZX} = \Re T\ln\left(\frac{k_{-2}^{ZX}[D_{ZX}^*]}{k_2^{ZX}[D_{ZX}]}\right) = \Re T\ln\left(\frac{[D_{ZX}^*]}{K_2^{ZX}[D_{ZX}]}\right) \quad (36)$$

Third, in this last step, the activated X-bound site releases the free DNA site and the co-repressor necessary for this process ($X_Z$). Because RNA polymerase is not bound, there is no recruitment of amino acids ($AA_z$) and transcription and translation of Z does not proceed: $D_{ZX}^* \leftrightarrow D_Z + X_Z$. If $k_3^{ZX}$ [s$^{-1}$] and $k_{-3}^{ZX}$ [s$^{-1}$·nM$^{-1}$] are the forward and backward kinetic constants, respectively, and $K_3^{ZX}=k_3^{ZX}/k_{-3}^{ZX}$ [nM$^1$] is the association equilibrium constant for this reaction, then the reaction flux and reaction chemical potential are given by:

$$J_3^{ZX} = k_3^{ZX}[D_{ZX}^*] - k_{-3}^{ZX}[D_Z][X_Z] \quad (37)$$

$$\Delta\mu_3^{ZX} = \Re T\ln\left(\frac{[D_Z][X_Z]}{K_3^{ZX}[D_{ZX}^*]}\right) \quad (38)$$

Figure 13:
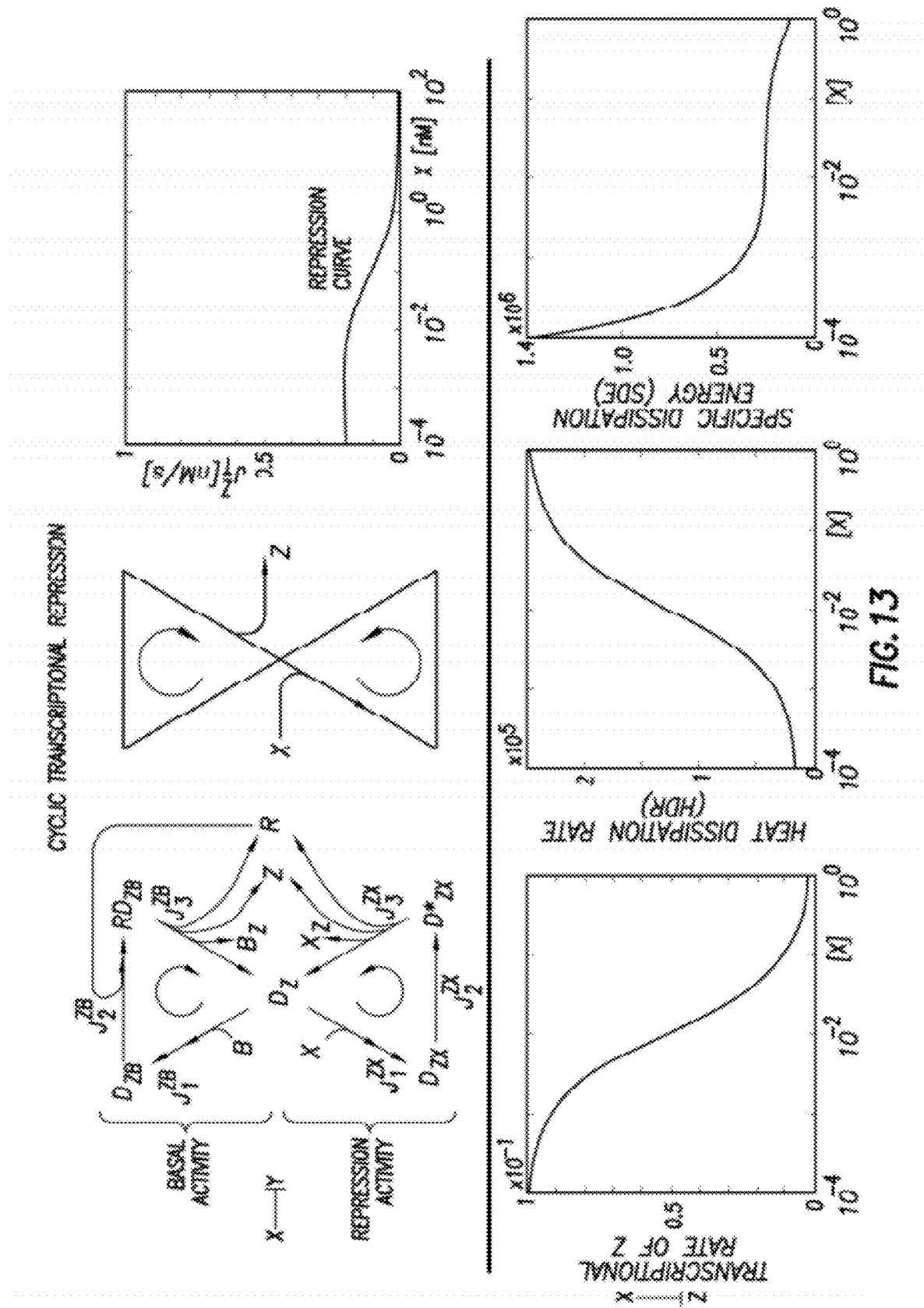
FIG. 13 shows examples in accordance with one or more embodiments.

The described steps 1, 2 and 3 are represented in the bottom triangular cycle in FIG. 13. Cycles on top represent the basal activity in which a basal transcription factor B binds the free promoter region of Z, initiating the cycle and further transcription of Z, follows the activation mechanism shown earlier.

Mass Balance Equations

The differential equations describing the repression system are the same as those presented in the activation mechanism with only two differences. First the mass balance equation of [Z] does not include $J_3^{ZX}$, because the transcription of Z is only due to the basal activity. Second, $RD_{ZX}$ is conceptually replaced by $D_{ZX}^*$. For the repression process, the total concentration of DNA sites is now written as:

$$[D_Z]_{tot}=[D_Z]+[D_{ZX}]+[D_{ZB}]+[D_{ZX}^*]+[RD_{ZB}] \quad (39)$$

Steady State Solution

At nonequilibrium steady state (NESS), it can be shown that equations 19-23 are also valid in the repression mechanism. However, when X is a repressor, the total transcription rate of Z equals only the basal cyclic flux: $J_T^Z=J_T^{ZB}=J_3^{ZB}=J_C^{ZB}$. As [X]→0, the basal transcription rate $J_{T,Basal}^Z$ (eq. 24) follows the same relationship as in the activation case: the basal transcription rate is independent of the activating or repressing nature of X. However, as expected, the basal transcription rate corresponds to the maximal transcription rate. As [X]→∞, the transcription rate of Z decreases and approaches to zero: $J_{T,Min}^Z=0$. Moreover, the concentration of X required to reach half of ($J_{T,Basal}^Z - J_{T,Min}^Z)=J_{T,Basal}^Z$, $K^X$, is determined by the same relationship between $\kappa^{ZX}$ and $\kappa^{ZB}$ shown in equation (26). FIG. 13 shows the solution for irreversible reactions that are far away from thermodynamic equilibrium. Finally, it is observed that the transcription rate of Z follows a Hill's first order equation for repressor activity:

$$J_T^Z = \frac{J_{T,Basal}^Z}{1+\frac{[X]}{K^X}} \quad (41)$$

Energy of Repression

Equations 29-30 express the general concept of the HDR$^Z$ [J·s$^{-1}$] associated with any transcription process, and thus are valid for representing the repression scenario. However, the cyclic chemical potential equation given by 31 must be changed since the overall reactions are different:

$$\Delta\mu_C^{ZI} = \Delta\mu_1^{ZI} + \Delta\mu_2^{ZI} + \Delta\mu_3^{ZI} = \Re T\ln\left(\frac{[I_Z][P_Z]}{K_1^{ZI}K_2^{ZI}K_3^{ZI}[I]}\right) \quad (41)$$

where $$[P_Z] = \begin{cases} [Z], & \text{if } I = B \text{ (or } I \text{ is an activator)} \\ 1, & \text{if } I = X \text{ (or } I \text{ is a repressor)} \end{cases}$$

Solution of the mass balance will allow the computation of $J_X$ for the final determination of SDE$^Z$, as defined by equation 32. The plots shown in FIG. 13 show the results for the transcription rate of Z, HDR, and SDE according to the model described above.

EXAMPLE 3

Transcriptional Regulation of Z by Two Transcription Factors X and Y

In this section, a model for a biological circuit that for multi-gene regulation is developed. Specifically, the formulation for the transcription (activation and repression) of the protein Z by two transcription factors X and Y, as shown in FIG. 14 is presented.

Mechanism

The basic mechanism by which two transcription factors activate or repress protein transcription is the three step process described previously for activation and for repression described above. The multi-gene regulation model disclosed herein allows both X and Y (and basal transcription factor B) to compete for a free DNA site in the promoter region of Z. The competitive binding is irrespective of whether X (or Y) is an activator or a repressor. However, in addition to the individual TF binding to $D_Z$, there is also a joint interaction between X and Y, so in principle the complex XY may be considered as an additional transcription factor whose concentration is given by the product between the concentration of X and Y. In other words, [XY]=[X][Y]. The activator or repressor nature of this complex depends on two factors:

1) The independent activation-repression nature of X and Y.

2) The Boolean input logic used to transcribe Z which can be AND or OR.

Figure 14A:
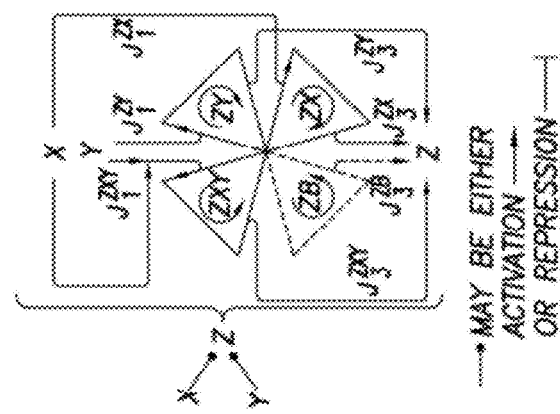
FIGS. 14A-14B show examples in accordance with one or more embodiments.

In order to explain the Boolean input logic, let us assume that both X and Y are activators of Z. In principle, protein Z should be transcribed at least from the individual binding of X and Y. However, this is not completely true. If both TF X and Y are required to transcribe Z (Boolean input logic AND), then transcription cannot proceed with individual binding of X or Y. Therefore when individually present, TF X or Y will bind to the promoter site without transcribing Z, and thus acts as repressor contrary to their activating nature. Therefore, when both X and Y are present for AND input logic, transcription of Z can only proceed from the XY cycle (and from the basal cycle ZB which by definition is always transcribing Z). This XY complex will bind the promoter region, recruit RNA polymerase and finally transcribe (and translate) Z. On the other hand, if only one of the two transcription factors is required (Boolean input logic OR) for transcription of Z, then the individual binding as well as the complex XY binding, will lead to formation of Z, as shown in FIG. 14A, which gives a simplified representation of the four cycles is presented. The cycles, entering and leaving fluxes for ZX, ZY and ZXY are represented as solid lines. The activator and repressor behaviors are arrows according to the input logic and independent nature of X and Y as shown in the tables in FIG. 14A. Repressor behaviors are noted with the R character. When the cycle ZI behaves as a repressor (for I=X, Y, XY), the transcription flux $J_3^{ZI}$ is not present (as shown in FIG. 3), and thus the corresponding arrow is not shown in FIG. 14A.

Mass Balance Solution

Figure 14B:
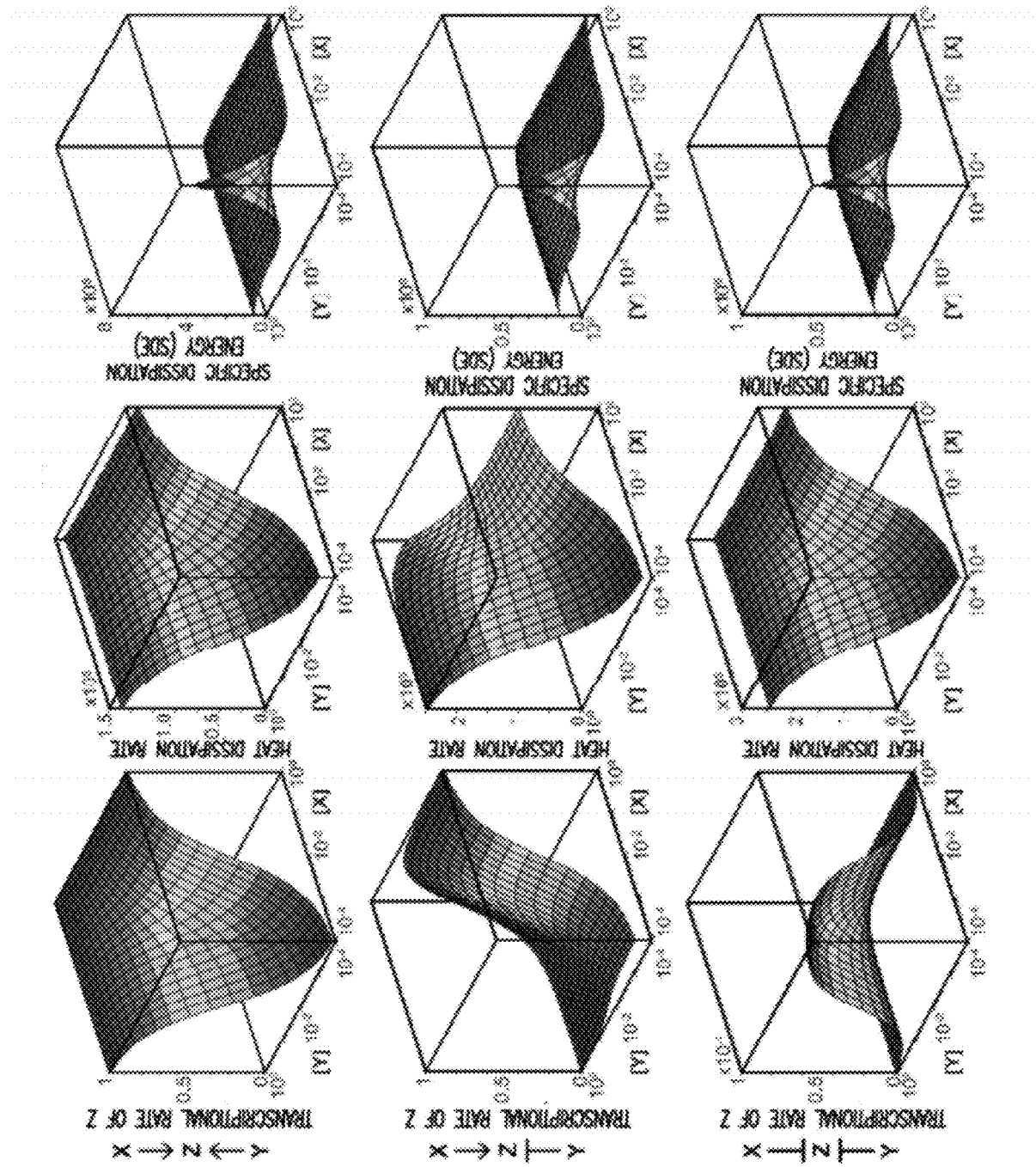
Figure 15:
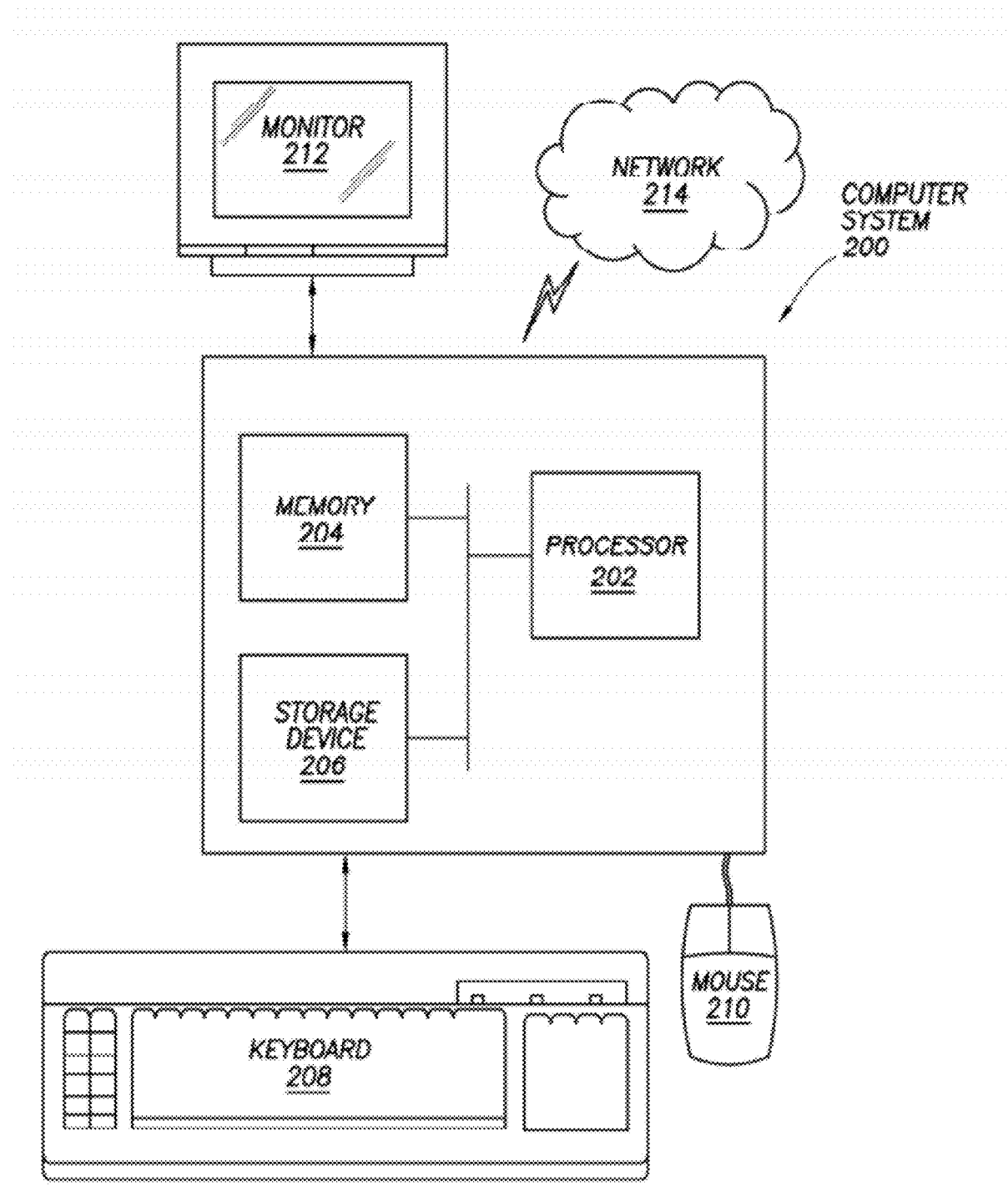
FIG. 15 shows a computer system in accordance with one or more embodiments.

If the irreversibility condition is satisfied, then the cyclic fluxes can be approximated as follows:

$$J_C^{ZI} = \frac{\beta^{ZI}[I]}{\kappa^{ZI} + \sum_{J=B,X,Y,XY} \frac{\kappa^{ZI}}{\kappa^{KJ}}[J]}, \quad (42)$$

where $\beta^{ZI}$ and $\kappa^{ZI}$ are defined by equations (20) and (21), respectively. FIG. 14B presents the transcription rate surface for both input logics OR and AND, using the approximated solution.

For Boolean input logic OR, $J_T^Z = J_C^{ZB} + J_C^{ZX} + J_C^{ZY} + J_C^{ZXY}$. If both basal activity and the transcription rate from the combined activity of X and Y are zero (i.e., $\beta^{ZXY}$ is very low and $\kappa^{ZXY}$ is very high), the expression for the total transcription rate of Z, given by equation (42) equals:

$$J_T^Z = \frac{\beta^{ZX}\frac{[X]}{\kappa^{ZX}}}{1 + \frac{[X]}{\kappa^{ZX}} + \frac{[Y]}{\kappa^{ZY}}} + \frac{\beta^{ZY}\frac{[Y]}{\kappa^{ZY}}}{1 + \frac{[Y]}{\kappa^{ZY}} + \frac{[X]}{\kappa^{ZX}}} \quad (43)$$

For Boolean input logic AND case, transcription rate of Z is given by the basal activity and the combined interaction of X and Y: $J_T^Z = J_C^{ZB} + J_C^{ZXY}$. If basal activity is zero and $\kappa^{ZXY} = \kappa^{ZX}\kappa^{ZY}$, then the expression for $J_T^Z$ (42) also equals the relationship:

$$J_T^Z = \frac{\beta^{ZX}\frac{[X]}{\kappa^{ZX}}}{1 + \frac{[X]}{\kappa^{ZX}}} \cdot \frac{\beta^{ZY}\frac{[Y]}{\kappa^{ZY}}}{1 + \frac{[Y]}{\kappa^{ZY}}} \quad (43)$$

Energy of Transcription

At steady state, the total HDR for this four-cycle system can be written as follows:

$$HDR^Z = -\sum_{I=B,X,Y,XY} J_C^{ZI} \Delta\mu_C^{ZI} \quad (44)$$

where (45)

$$\Delta\mu_C^{ZI} = \Re T \ln\left(\frac{[I_Z][P_Z]}{K_1^{ZI}K_2^{ZI}K_3^{ZI}[I]}\right)$$

The analytical solution for $HDR^Z$ is highly complex and input logic dependent in this scenario, thus numerical solutions are required. These numerical solutions are shown in FIG. 14B for transcription rate of Z, HDR, and SDE, respectively.

Embodiments of the invention may be implemented on virtually any type of computer regardless of the platform being used. For example, as shown in FIG. 4, a computer system (200) includes one or more processor(s) (202), associated memory (204) (e.g., random access memory (RAM), cache memory, flash memory, etc.), a storage device (206) (e.g., a hard disk, an optical drive such as a compact disk drive or digital video disk (DVD) drive, a flash memory stick, etc.), and numerous other elements and functionalities typical of today's computers (not shown). The computer (200) may also include input means, such as a keyboard (208), a mouse (210), or a microphone (not shown). Further, the computer (200) may include output means, such as a monitor (212) (e.g., a liquid crystal display (LCD), a plasma display, or cathode ray tube (CRT) monitor). The computer system (200) may be connected to a network (214) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. For example, the computer system (200) may be a server system having multiple blades. Generally speaking, the computer system (200) includes at least the minimal processing, input, and/or output means necessary to practice embodiments of the invention. Further, software instructions to perform embodiments of the invention may be stored on a computer readable medium such as a compact disc (CD), a diskette, a tape, or any other computer readable storage device.

While the embodiments have been described with respect to a limited number of embodiments, those skilled in the art, having benefit of this disclosure, will appreciate that other embodiments may be devised which do not depart from the scope of the embodiments as disclosed herein. Accordingly, the scope of the embodiments should be limited only by the attached claims.

What is claimed is:

1. A method for designing a biological circuit, comprising:
  obtaining a target circuit objective for the biological circuit;
  determining an objective function corresponding to the target circuit objective;
  obtaining a number of nodes for the biological circuit;
  obtaining a set of possible circuit subgraphs using the number of nodes;
  obtaining, by a processor, a specific dissipation energy (SDE) for each one of the set of possible circuit subgraphs by optimizing the objective function, wherein the SDE is a ratio of the heat dissipation rate (HDR) to input mass flux (J) in a non-equilibrium steady state (NESS) system;

selecting at least one circuit subgraph from the set of possible circuit subgraphs with the lowest SDE; and designing the biological circuit using the at least one selected one circuit subgraph.

2. The method of claim 1, wherein at least one node in the biological circuit is one selected from a group consisting of a gene and a metabolite.

3. The method of claim 2, wherein the at least one node in the gene circuit is connected using linkages, wherein the linkages comprise biological molecules.

4. The method of claim 3, wherein the biological molecules comprise one selected from a group consisting of proteins, transcription factor activators, transcription factor repressors, mRNA, and enzymes.

5. The method of claim 1, wherein the target circuit objective is one selected from a group consisting of a steady-state objective and a dynamic function objective.

6. The method of claim 1, wherein the SDE comprises a Pareto-averaged SDE.

7. The method of claim 1, wherein the SDE comprises a time-averaged SDE.

8. A non-transitory computer readable medium comprising software instructions, which when executed by a process to perform a method, the method comprising:

obtaining a target circuit objective for a biological circuit;

determining an objective function corresponding to the target circuit objective;

obtaining a number of nodes for the biological circuit;

obtaining a set of possible circuit subgraphs using the number of nodes;

obtaining a specific dissipation energy (SDE) for each one of the set of possible circuit subgraphs by optimizing the objective function, wherein the SDE is a ratio of the heat dissipation rate (HDR) to input mass flux (J) in a non-equilibrium steady state (NESS) system;

selecting at least one circuit subgraph from the set of possible circuit subgraphs with the lowest SDE; and designing the biological circuit using the at least one selected circuit subgraph.

9. The non-transitory computer readable medium of claim 8, wherein at least one node in the biological circuit is one selected from a group consisting of a gene and a metabolite.

10. The non-transitory computer readable medium of claim 9, wherein the at least one node in the gene circuit are connected using linkages, wherein the linkages comprise biological molecules.

11. The non-transitory computer readable medium of claim 10, wherein the biological molecules comprise one selected form a group consisting of proteins, transcription factor activators, transcription factor repressors, mRNA, and enzymes.

12. The non-transitory computer readable medium of claim 8, wherein the target circuit objective is one selected from a group consisting of a steady-state objective and a dynamic function objective.

13. A method for designing a biological circuit, comprising:

obtaining a target circuit objective for the biological circuit;

obtaining a set of possible circuit subgraphs based on the target circuit objective;

obtaining, by a processor, a specific dissipation energy (SDE) for each one of the set of possible circuit subgraphs using a network model, wherein the SDE is a ratio of the heat dissipation rate (HDR) to input mass flux (J) in a non-equilibrium steady state (NESS) system;

selecting at least one circuit subgraph of the set of possible circuit subgraphs with the lowest SDE; and designing the biological circuit using the at least one selected circuit subgraph.

14. The method of claim 13, wherein at least one node in the biological circuit is one selected from a group consisting of a gene and a metabolite.

15. The method of claim 14, wherein nodes in the gene circuit are connected using linkages, wherein the linkages comprise biological molecules.

16. The method of claim 15, wherein the biological molecules comprise one selected form a group consisting of proteins, transcription factor activators, transcription factor repressors, mRNA, and enzymes.

17. The method of claim 13, wherein the SDE is a time averaged SDE.

18. The method of claim 13, wherein the target circuit objective is one selected from a group consisting of a steady-state objective and a dynamic function objective.

19. The method of claim 13, wherein obtaining the SDE for each of the set of possible circuit subgraphs comprises using the kinetic network model, wherein all linkages between nodes in each subgraph are assigned parameters having equal values.

20. The method of claim 13, wherein the set of all possible circuit subgraphs comprises a topologically generalized set.

* * * * *

UNITED STATES PATENT AND TRADEMARK OFFICE
CERTIFICATE OF CORRECTION

| | | |
|---|---|---|
| PATENT NO. | : 8,504,948 B2 | Page 1 of 1 |
| APPLICATION NO. | : 13/250043 | |
| DATED | : August 6, 2013 | |
| INVENTOR(S) | : Deepak Nagrath et al. | |

It is certified that error appears in the above-identified patent and that said Letters Patent is hereby corrected as shown below:

On the title page, item (56) References Cited, page 2, line 68,
the word "and . Bioengineering" should read -- and Bioengineering --.

On the title page, item (56) References Cited, page 2, line 100,
the word "Nati" should read -- Natl --.

On the title page, item (56) References Cited, page 3, line 54,
the word "Kremlin" should read -- Kremling --.

On the title page, item (56) References Cited, page 3, line 54,
the word "gurarantees" should read -- guarantees --.

Signed and Sealed this
Twenty-fourth Day of December, 2013

Margaret A. Focarino
*Commissioner for Patents of the United States Patent and Trademark Office*